United States Patent
Lee et al.

(10) Patent No.: US 10,353,500 B2
(45) Date of Patent: Jul. 16, 2019

(54) TOUCH DEVICE

(71) Applicant: LG INNOTEK CO., LTD., Seoul (KR)

(72) Inventors: Jin Seok Lee, Seoul (KR); Jung Hwan Bang, Seoul (KR); Dong Keun Lee, Seoul (KR); Taek Hoon Nam, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 142 days.

(21) Appl. No.: 15/546,397

(22) PCT Filed: Jan. 22, 2016

(86) PCT No.: PCT/KR2016/000750
§ 371 (c)(1),
(2) Date: Jul. 26, 2017

(87) PCT Pub. No.: WO2016/122173
PCT Pub. Date: Aug. 4, 2016

(65) Prior Publication Data
US 2017/0371461 A1 Dec. 28, 2017

(30) Foreign Application Priority Data

Jan. 27, 2015 (KR) .................. 10-2015-0012928
Jul. 22, 2015 (KR) .................. 10-2015-0103990
Oct. 23, 2015 (KR) .................. 10-2015-0147996

(51) Int. Cl.
*G06F 3/041* (2006.01)
*G06K 9/00* (2006.01)
(Continued)

(52) U.S. Cl.
CPC .......... *G06F 3/0412* (2013.01); *G02F 1/1343* (2013.01); *G02F 1/13338* (2013.01);
(Continued)

(58) Field of Classification Search
CPC ...... G06F 3/412; G06F 3/044; G02F 1/13338; G02F 1/1343; G06K 9/00
(Continued)

(56) References Cited

U.S. PATENT DOCUMENTS 6,401,551 B1   6/2002   Kawahara et al.
2011/0298711 A1   12/2011   Dean et al.
(Continued)

FOREIGN PATENT DOCUMENTS

CN   107325596   11/2017
JP   2000-254998   9/2000
(Continued)

OTHER PUBLICATIONS

International Search Report (with English Translation) and Written Opinion dated Jun. 23, 2016 issued in Application No. PCT/KR2016/000750.
(Continued)

*Primary Examiner* — Calvin C Ma
(74) *Attorney, Agent, or Firm* — Ked & Associates, LLP

(57) ABSTRACT

A touch device according to one embodiment comprises: A touch device according to one embodiment comprises: a display panel; and a touch device on the display panel, and the touch device includes: a substrate including one surface and an opposite surface; a receiving groove formed in one surface; and a protrusion part formed on the opposite surface, and an area, in which the receiving groove is formed, overlaps with an area in which the protrusion part is formed, and a fingerprint sensor is provided in the receiving groove, and a substrate thickness in the area, in which the protrusion part is formed, is thinner than a substrate thickness in the area having no protrusion part.

19 Claims, 21 Drawing Sheets

(51) Int. Cl.
*G02F 1/1333* (2006.01)
*G02F 1/1335* (2006.01)
*G02F 1/1343* (2006.01)
*G02F 1/1362* (2006.01)
*G06F 3/044* (2006.01)

(52) U.S. Cl.
CPC .. *G02F 1/133512* (2013.01); *G02F 1/136286* (2013.01); *G06F 3/044* (2013.01); *G06K 9/00* (2013.01); *G06K 9/0002* (2013.01); *G06F 2203/04112* (2013.01)

(58) Field of Classification Search
USPC .................................................. 345/173, 174
See application file for complete search history.

(56) References Cited

U.S. PATENT DOCUMENTS

| | | |
|---|---|---|
| 2012/0105081 A1 | 5/2012 | Shaikh et al. |
| 2012/0146921 A1 | 6/2012 | Park |
| 2013/0076667 A1 | 3/2013 | Jiang et al. |
| 2013/0108124 A1 | 5/2013 | Wickboldt et al. |
| 2014/0047706 A1* | 2/2014 | Shaikh ................ G06K 9/0002 29/622 |
| 2014/0204054 A1 | 7/2014 | Kim |
| 2015/0189136 A1* | 7/2015 | Chung, II .......... G06K 9/00013 348/77 |

FOREIGN PATENT DOCUMENTS

| | | |
|---|---|---|
| KR | 20-2009-0002567 | 3/2009 |
| KR | 10-2013-0046387 | 5/2013 |
| KR | 10-2016-0092373 | 8/2016 |
| KR | 10-2017-0067930 | 6/2017 |
| KR | 10-1790499 | 10/2017 |
| KR | 10-2018-0058001 | 5/2018 |
| WO | WO 2013/040961 | 3/2013 |

OTHER PUBLICATIONS

European Search Report dated Dec. 12, 2018 issued in Application No. 18188161.6.

* cited by examiner

TOUCH DEVICE

CROSS-REFERENCE TO RELATED PATENT APPLICATIONS

This application is a U.S. National Stage Application under 35 U.S.C. § 371 of PCT Application No. PCT/KR2016/000750, filed Jan. 22, 2016, which claims priority to Korean Patent Application No. 10-2015-0012928, filed Jan. 1, 2015, Korean Patent Application No. 10-2015-0103990, filed Jul. 22, 2015, and Korean Patent Application No. 10-2015-0147996, filed Oct. 23, 2015, whose entire disclosures are hereby incorporated by reference.

TECHNICAL FIELD

The embodiment relates to a touch device.

BACKGROUND ART

Recently, a fingerprint sensor, which detects the fingerprint of a person, has been extensively used even to determine the on/off of power and the release of a sleep mode in an electronic device, as well as a door lock, to which the fingerprint sensor has been conventionally widely applied.

Fingerprint sensors may be classified into an ultrasonic fingerprint sensor, an infrared fingerprint sensor, and a capacitive fingerprint sensor according to the operating principles thereof.

For example, in the capacitive fingerprint sensor, a substrate has a first electrode and a second electrode formed thereon to perform a transmission function and a reception function. Accordingly, the first electrode and the second electrode may transmit/receive a signal according to the touch of a fingerprint, thereby recognizing the fingerprint.

When such a fingerprint sensor is applied to the touch window, a characteristic of sensing the fingerprint may be degraded due to the thickness of the cover substrate.

Accordingly, there is required a touch window including a fingerprint recognition sensor having a novel structure, capable of solving the problem.

DISCLOSURE

Technical Problem

The embodiment provides a touch device including a fingerprint sensor having an improved fingerprint sensing function.

Technical Solution

A touch device according to one embodiment comprises: a display panel; and a touch device on the display panel, and the touch device includes: a substrate including one surface and an opposite surface; a receiving groove formed in one surface; and a protrusion part formed on the opposite surface, and an area, in which the receiving groove is formed, overlaps with an area in which the protrusion part is formed, and a fingerprint sensor is provided in the receiving groove, and a substrate thickness in the area, in which the protrusion part is formed, is thinner than a substrate thickness in the area having no protrusion part.

Advantageous Effects

According to the touch window of the embodiment, the fingerprint sensor may be provided on the cover substrate having the step difference and including the active area and the inactive area. In other words, the outer dummy layer may be provided on the inactive area of the cover substrate and the fingerprint sensor may be provided on the outer dummy layer. In addition, the thickness of the cover substrate in the active area may be provided to be thicker than that of the cover substrate in the inactive area.

Accordingly, the erroneous operation and the failure of the fingerprint sensor resulting from the thickness of the touch window may be reduced.

In other words, as the thickness in the inactive area of the cover substrate is reduced, the reliability of the fingerprint sensor may be improved.

In addition, as the whole thickness in the inactive area of the cover substrate is reduced, visibility may be prevented from being reduced due to the partial etching for the cover substrate corresponding to the fingerprint sensor.

In addition, since several layers of outer dummy layers are provided, the stiffness of the cover substrate may be prevented from being weakened. Accordingly, the reliability of the touch window may be improved.

BEST MODE

Mode for Invention

Figure 1:
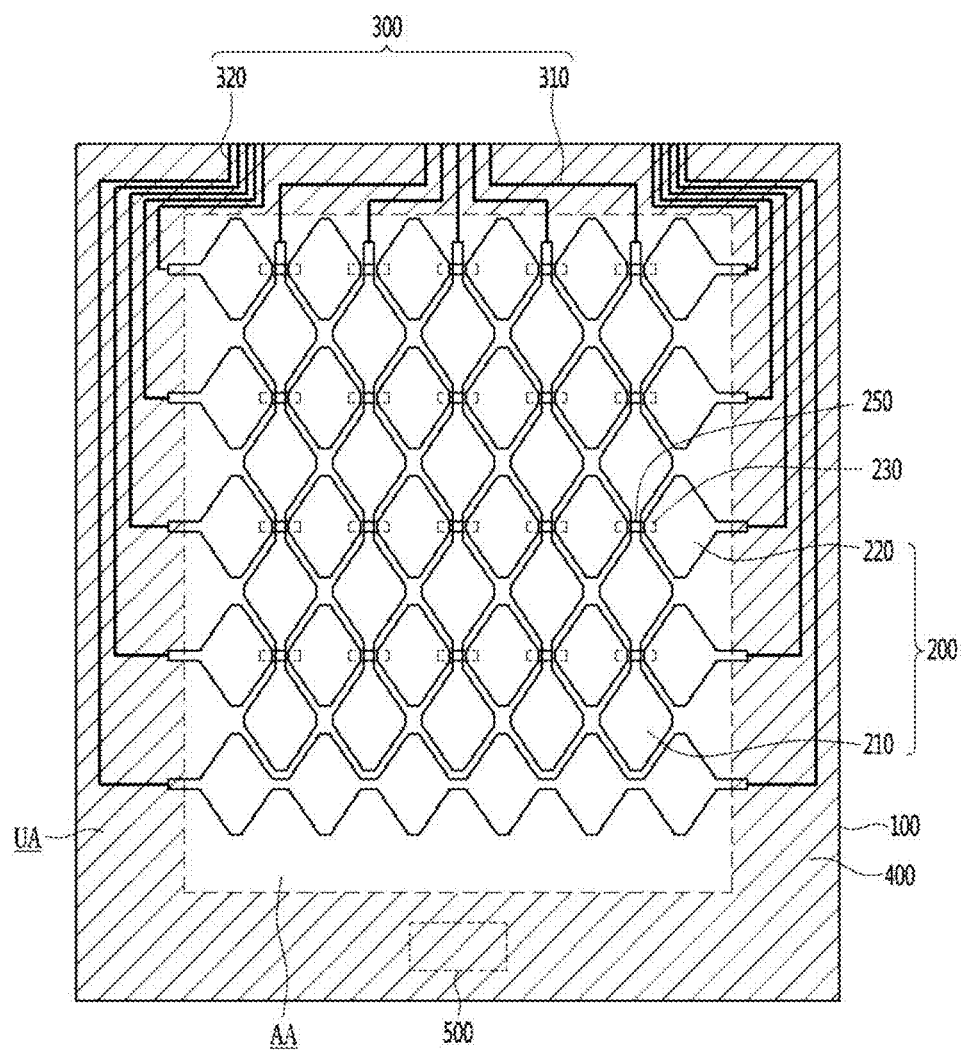
FIG. 1 is a plan view showing a touch window according to the embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

It will be understood that when a certain part is referred to as being "connected" with another part, it can be directly connected with the other part or intervening parts may be present. In the following description, when a predetermined part "includes" a predetermined element, the predetermined part does not exclude other elements, but may further include other components unless otherwise indicated.

The thickness and size of each layer (film), region, pattern, or structure shown in the drawings may be exaggerated, omitted or schematically drawn for the purpose of convenience or clarity. In addition, the size of the layer (film), region, pattern, or structure does not utterly reflect an actual size.

Referring to FIG. 1, a touch window according to the embodiment may include a cover substrate 100, a sensing electrode 200, a wiring electrode 300, and a fingerprint sensor 500. The touch window may be a cover window sensing a touch of fingerprint.

The cover substrate 100 may be rigid or flexible.

For example, the cover substrate 100 may include glass or plastic. In detail, the cover substrate 100 may include chemically tempered/semi-tempered glass, such as soda lime glass or aluminosilicate glass, reinforced/flexible plastic, such as polyimide (PI), polyethylene terephthalate (PET), propylene glycol (PPG), or poly carbonate (PC), or sapphire.

In addition, the cover substrate 100 may include an optically isotropic film. For example, the cover substrate 100 may include cyclic olefin copolymer (COC), cyclic olefin polymer (COP), optically isotropic polycarbonate (PC), or optically isotropic polymethyl methacrylate (PMMA).

The sapphire has superior electric characteristics, such as permittivity, to greatly increase a touch response speed and a space touch, such as hovering, may be easily implemented. In addition, since the sapphire has high surface hardness, the sapphire is applicable to a cover substrate. The hovering refers to a technique of recognizing coordinates even at a slight distance from a display.

In addition, the cover substrate 100 may be bent to have a partially curved surface. In other words, the cover substrate 100 may have a partial flat surface and a partial curved surface. In detail, an end of the cover substrate 100 may be bent to have a curved surface or may be bent or curved to have a surface with a random curvature.

In addition, the cover substrate 100 may include a flexible substrate having a flexible property.

Further, the cover substrate 100 may include a curved or bended substrate. In other words, even the touch window including the cover substrate 100 may be formed to have a flexible, curved or bended property. Accordingly, the touch window according to the embodiment may be easily carried by a user or variously designed.

The sensing electrode 200 and the wiring electrode 300 may be provided on the substrate. In other words, the cover substrate 100 may be a support substrate In addition, an additional substrate may be additionally provided on the cover substrate 100. In other words, the sensing electrode and the wiring electrode may be supported by the substrate, and the substrate and the cover substrate may be bonded to each other through an adhesive layer.

Accordingly, since the cover substrate may be formed separately from the substrate, the touch window may be advantageous in mass production.

The cover substrate 100 may have an active area AA and an inactive area UA defined therein.

An image may be displayed on the active area AA. The image is not displayed on the inactive area UA provided around the active area AA.

In addition, the position of an input device (e.g., a finger, a stylus pen, etc.) may be sensed in at least one of the active area AA and the inactive area UA. If the input device, such as a finger, touches the touch window, the variation in capacitance occurs in the touched part by the input device, and the touched part subject to the variation in the capacitance may be detected as a touch point.

Hereinafter, the cover substrate 100 and the fingerprint sensor 500 of the touch window according to the embodiment will be described with reference to FIGS. 2 to 7.

Figure 2:
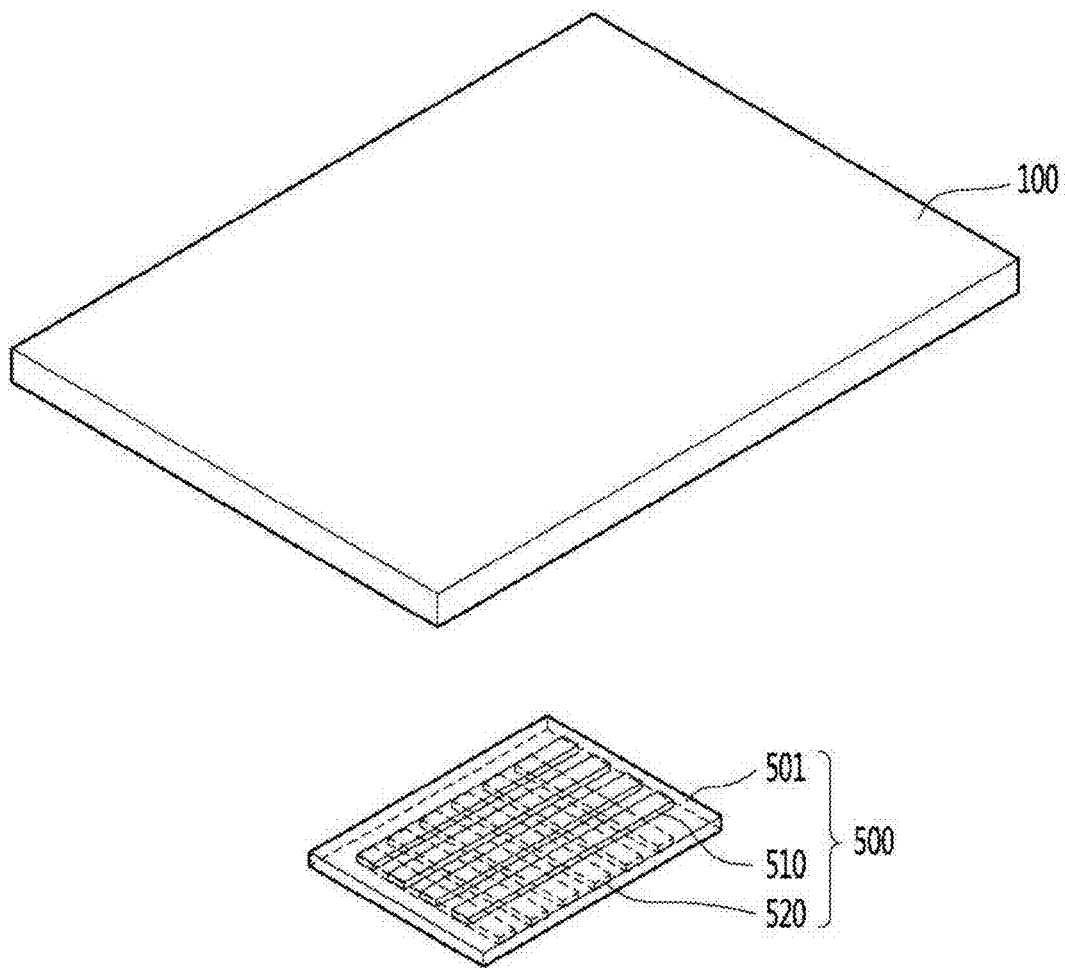
FIG. 2 is a perspective view showing a fingerprint sensor according to a first embodiment.

Referring to FIG. 2, the fingerprint sensor 500 may be provided on the cover substrate 100.

The fingerprint sensor 500 may include a substrate 501, a first electrode 510, and a second electrode 520.

The substrate 501 may include a material corresponding to or similar to that of the cover substrate 100.

The size of the cover substrate 100 may be different from that of the substrate 510. In detail, the sectional area of the substrate 501 may be equal to or less than that of the cover substrate 100. For example, the sectional area of the substrate 501 may be less than that of the cover substrate 100.

In addition, the substrate 501 may be a piezoelectric film. For example, the substrate 501 may include a transparent piezoelectric film, a semi-transparent piezoelectric film, or an opaque piezoelectric film.

The substrate 501 may include various piezoelectric materials. For example, the substrate 501 may include single crystal ceramics, polycrystalline ceramics, a polymer material, a thin film material, and a composite material of a polycrystalline material and a polymer material.

The piezoelectric material of the single crystal ceramics may include $\alpha$-AlPO$_4$, $\alpha$-SiO$_2$, LiTiO$_3$, LiNbO$_3$, SrxBayNb$_2$O$_3$, Pb$_5$—Ge$_3$O$_{11}$, Tb$_2$(MnO$_4$)$_3$, Li$_2$B$_4$O$_7$, CdS, ZnO, or Bi$_{12}$SiO$_{20}$ or Bi$_{12}$GeO$_{20}$.

The piezoelectric material of the polycrystalline ceramics may include a PZT-based material, a PT-based material, a PZT-complex perovskite-based material, or BaTiO$_3$.

In addition, the piezoelectric material of the polymer material may include PVDF, P(VDF-TrFe), P(VDFTeFE), or TGS.

In addition, the piezoelectric material of the thin film material may include ZnO, CdS, or AlN.

Further, the piezoelectric material of the composition material may include PZT-PVDF, PZT-Silicone Rubber, PZT-Epoxy, PZT-foamed polymer, or PZT-foamed urethane.

The substrate 501 according to the embodiment may include a polymer piezoelectric material. For example, the substrate 501 according to the first embodiment may include a piezoelectric material including at least one of PVDF, P(VDF-TrFe) and P(VDFTeFE).

At least one of the first electrode 510 and the second electrode 520 may be provided on the substrate 501. For example, at least one of the first electrode 510 and the second electrode 520 may be provided on at least one of one surface of the substrate 501 and an opposite surface of the substrate 501.

Referring to FIG. 2, the first electrode 510 may be provided on one surface of the substrate 501, and the second electrode 520 may be provided an opposite surface of the substrate 501.

At least one of the first electrode 510 and the second electrode 520 may include a conductive material.

For example, at least one of the first and second electrodes 510 and 520 may include a transparent conductive material allowing the flow of electricity without interrupting the transmission of light. For example, at least one of the first and second electrodes 510 and 520 may include metal oxide such as indium tin oxide (ITO), indium zinc oxide (IZO), copper oxide, tin oxide, zinc oxide, or titanium oxide.

In addition, at least one of the first and second electrodes 510 and 520 may include a nanowire, a photo-sensitive nanowire film, a carbon nanotube (CNT), graphene, conductive polymer or a mixture thereof.

At least one of the first and second electrodes 510 and 520 may include various metals. For example, at least one of the first and second electrodes 510 and 520 may include at least one of chrome (Cr), nickel (Ni), copper (Cu), aluminum (Al), silver (Ag), molybdenum (Mo), gold (Au), titanium (Ti) and the alloy thereof.

At least one of the first and second electrodes 510 and 520 may be formed in a mesh shape. In detail, at least one of the first and second electrodes 510 and 520 may have a mesh shape by sub-electrodes crossing each other.

Although FIG. 2 shows that the first electrode 510 and the second electrode 520 are formed in a bar pattern, the embodiment is not limited thereto. The first and second electrode 510 and 520 may have various shapes such as a polygonal shape including a rectangular shape, a diamond shape, a pentagonal shape, or a hexagonal shape, or a circular shape.

Figure 5:
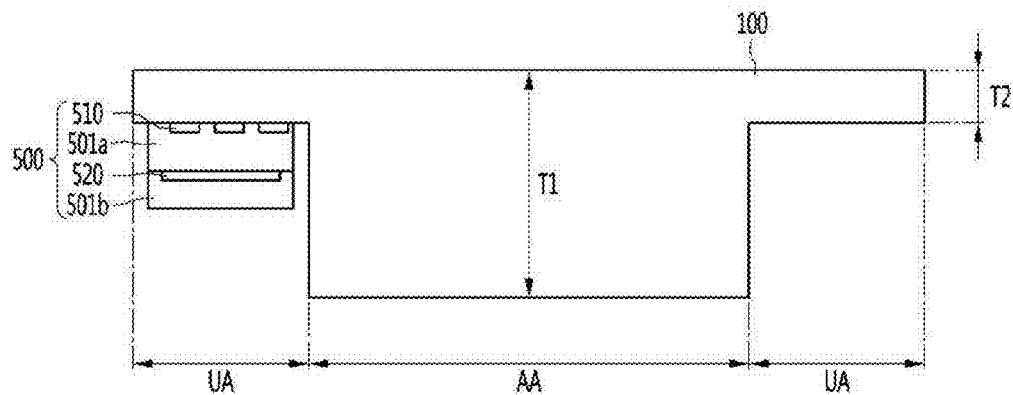
FIG. 5 is a sectional view taken along line A-A' of FIG. 3.

In addition, referring to FIG. 5, the first electrode 510 and the second electrode 520 may be provided mutually different positions.

For example, the first electrode 510 may be provided on one surface of the cover substrate 100. In addition, the second electrode 520 may be provided on one surface of a first substrate 501a. In detail, the first electrode 510 and the second electrode 520 may be provided on the top and the bottom of the first substrate 501a.

For example, the first electrode 510 may be provided on the first substrate 501a, and the second electrode 520 may be provided on a second substrate 501b.

The first substrate 501a and the second substrate 501b may include materials corresponding to each other or mutually different from each other. For example, at least one of the first substrate 501a and the second substrate 501b may include materials corresponding to or similar to a material constituting the cover substrate 100. In addition, at least one of the first substrate 501a and the second substrate 501b may be a piezoelectric film.

Figure 3:
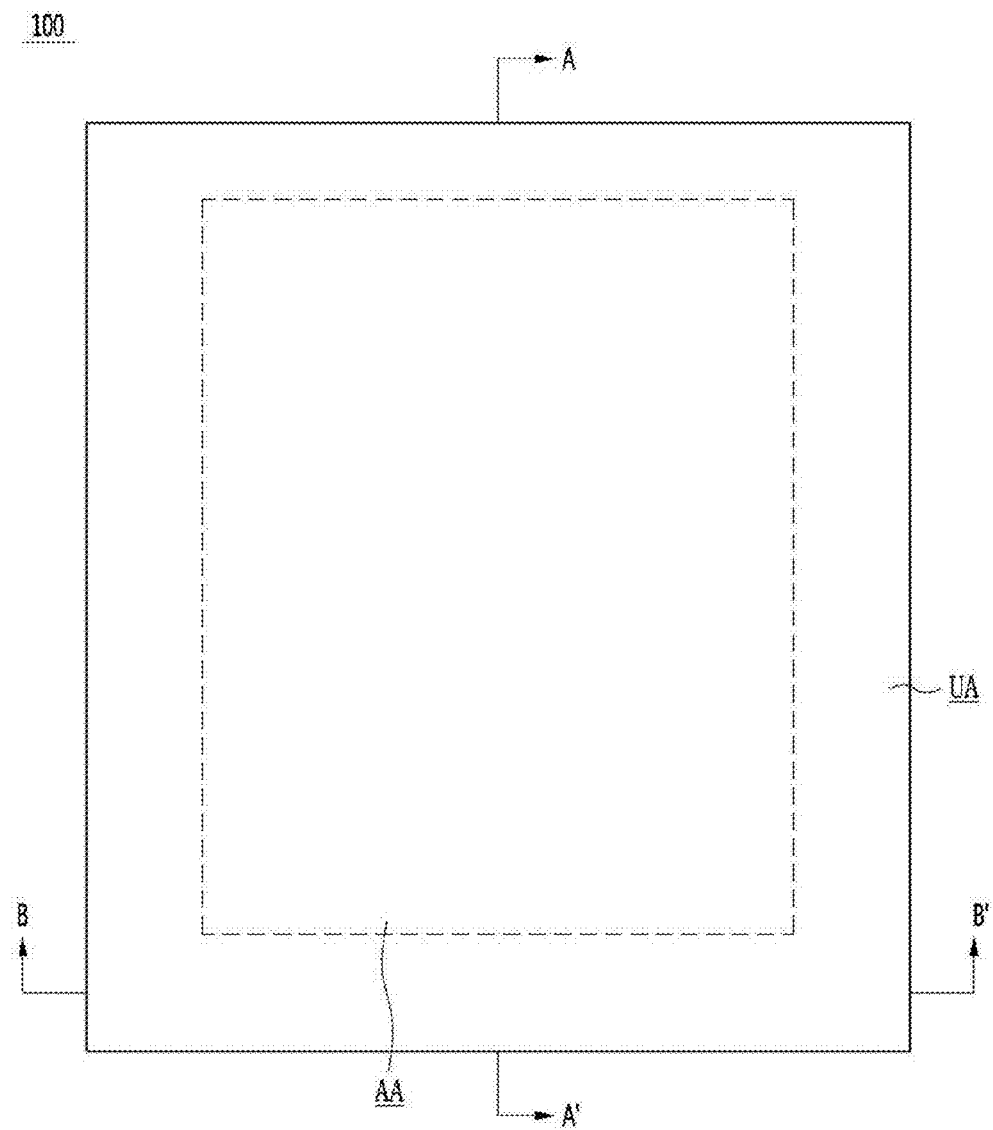
FIG. 3 is a plan view showing a cover substrate according to the first embodiment.

Referring to FIG. 3, the cover substrate 100 may have a step difference. For example, the step difference may be formed in the cover substrate 100 including the active area AA and the inactive area UA.

For example, the step difference may be formed in a portion of the inactive area UA. For example, a portion of the inactive area UA, in which the fingerprint sensor is provided, may have the step difference.

For example, the entire portion of the inactive area UA may be stepped. In detail, the cover substrate may have different thicknesses in the active area AA and the inactive area UA. Accordingly, the step difference may be formed in the cover substrate 100.

Figure 4:
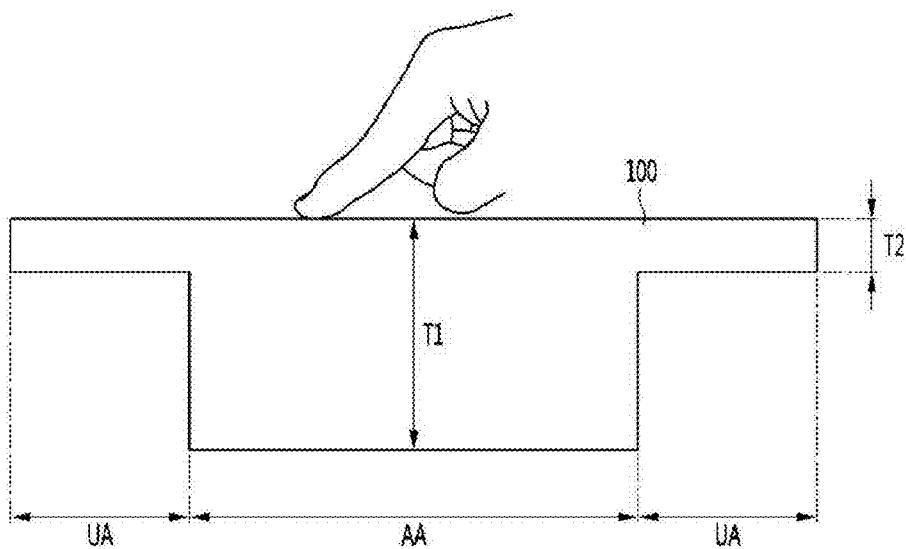
FIG. 4 is a sectional view taken along line A-A' of FIG. 3.

Referring to FIG. 4, the thickness T1 of the cover substrate in the active area AA may be less than the thickness T2 of the cover substrate 100 in the active area AA.

The thickness T1 of the cover substrate in the active area AA may be about 1000 μm or less. In detail, the thickness T1 of the cover substrate in the active area AA may be in the range of about 500 μm to about 1000 μm. In more detail, the thickness T1 of the cover substrate in the active area AA may be in the range of about 500 μm to about 70 μm.

When the thickness T1 of the cover substrate 100 in the active area AA may be less than about 500 μm, the stiffness of the cover substrate 100 may be weakened to cause cracks when the sensing electrode is formed on the cover substrate 100. In addition, when the thickness T1 of the cover substrate 100 in the active area AA may be more than about 1000 μm, the whole thickness of the touch window may be increased due to the thickness of the cover substrate 100.

The thickness T2 of the cover substrate in the inactive area UA may be about 200 μm or less. In detail, the thickness T2 of the cover substrate in the inactive area AA may be in the range of about 30 μm to about 200 μm. In more detail, the thickness T2 of the cover substrate in the inactive area UA may be in the range of about 30 μm to about 100 μm.

When the thickness T2 of the cover substrate in the inactive area UA may be less than about 30 μm, the stiffness of the cover substrate may be weakened to cause cracks when the wiring electrode is formed on the cover substrate. In addition, when the thickness T2 of the cover substrate in the inactive area UA may be more than about 200 μm, as thickness of the cover substrate 100 is increased, the distance between the fingerprint sensor provided in the inactive area and the touch surface of the cover substrate may be increased, thereby degrading the sensing characteristic of the fingerprint sensor.

In addition, the difference T1-T2 between the thicknesses of the cover substrate in the active area AA and the inactive area UA may be in the range of about 300 μm to about 900 μm. In detail, the difference T1-T2 between the thicknesses of the cover substrate in the active area AA and the inactive area UA may be in the range of about 300 μm to about 700 μm. In more detail, the difference T1-T2 between the thicknesses of the cover substrate 100 in the active area AA and the inactive area UA may be in the range of about 300 μm to about 500 μm.

When the difference T1-T2 between the thicknesses of the cover substrate in the active area AA and the inactive area UA may be less than about 300 μm, the distance between the fingerprint sensor provided in the inactive area and the touch surface of the cover substrate is increased, thereby degrading the sensing characteristic of the fingerprint sensor. When the difference T1-T2 between the thicknesses of the cover substrate in the active area AA and the inactive area UA may be more than about 900 μm, the stiffness of the cover substrate may be degraded due to the difference between the thicknesses of the cover substrate in the active area and the inactive area.

Referring to FIG. 5, the fingerprint sensor 500 may be provided in one area of the inactive area UA of the cover substrate 100.

Although FIG. 5 shows that the fingerprint sensor 500 is spaced apart from the stepped portion of the cover substrate 100, the fingerprint sensor 500 may make contact with the stepped portion of the cover substrate 100.

The thickness of the fingerprint sensor 500 may correspond to or different from the difference T1-T2 between the thicknesses of the cover substrate in the active area AA and the inactive area UA.

For example, the thickness of the fingerprint sensor 500 may be in the range of about 50 µm to about 700 µm. In detail, the thickness of the fingerprint sensor 500 may be in the range of about 100 µm of about 400 µm. In more detail, the thickness of the fingerprint sensor 500 may be in the range of about 100 µm of about 200 µm.

When the thickness of the fingerprint sensor 500 is less than about 50 µm, the endurance of the fingerprint sensor 500 may be degraded so that the fingerprint sensor 500 may be broken by external impact. Accordingly, the reliability of the fingerprint sensor 500 may be degraded. In addition, when the thickness of the fingerprint sensor 500 is more than about 700 µm, the sensitivity based on the contact of the fingerprint may be lowered according to the thickness of the fingerprint sensor 500. Accordingly, the efficiency of the fingerprint sensor 500 may be lowered.

Since the fingerprint sensor 500 is provided in the inactive area UA having the thickness thinner than that of the active area AA, the thickness of the cover substrate 100 may be reduced in an area having the fingerprint sensor 500. Accordingly, when a fingerprint makes contact with one surface of the cover substrate 100 to generate a signal, since the transmission distance of the signal to the fingerprint sensor may be reduced, the sensitivity based on the contact of the fingerprint may be improved, thereby improving the efficiency of the fingerprint sensor.

A decoration layer 400 and the fingerprint sensor 500 may be provided on the inactive area UA of the cover substrate 100.

Figure 6:
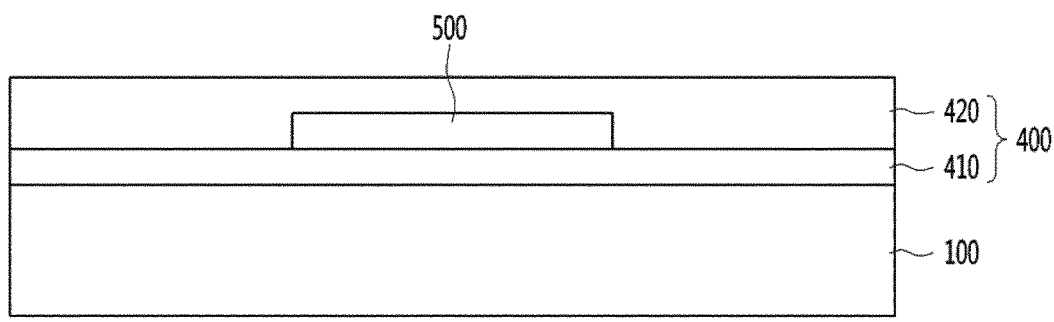
FIG. 6 is a sectional view taken along line B-B' of FIG. 3.

Referring to FIG. 6, a plurality of decoration layers 400 and the fingerprint sensor 500 may be provided on the inactive area UA of the cover substrate 100.

The decoration layer 400 may be provided on the entire portion of the inactive area UA of the cover substrate 100.

The decoration layer 400 may be formed by applying a material representing predetermined color to prevent the wiring electrode provided on the inactive area UA and a printed circuit board connecting the wiring electrode with an external circuit from being viewed from the outside.

The decoration layer 400 may represent color appropriate to a desired outer appearance. For example, the decoration layer 400 may include black or white pigments to represent black or white. In addition, various colors, such as white, black, red, and blue, may be realized by using a film.

The decoration layer 400 may include a film. Accordingly, when the cover substrate 100 is flexible or includes a curved surface, the decoration layer 400 may be easily provided on one surface of the cover substrate 100. In addition, the reliability of the decoration layer 400 may be improved by preventing the decoration layer 400 from being delaminated.

In addition, a desired logo may be formed on the decoration layer 400 in various manners. The decoration layer 400 may be formed through deposition, printing, wet coating, or adhering.

The decoration layer 400 may include a first decoration layer 410 and a second decoration layer 420.

For example, the first decoration layer 410 may be provided on the inactive area UA of the cover substrate 100. In addition, the second decoration layer 420 may be provided on the first decoration layer 410.

Although FIG. 6 shows only both of the first decoration layer 410 and the second decoration layer 420, the embodiment is not limited thereto. A plurality of decoration layers may be further provided on the second decoration layer 420.

The first decoration layer 410 and the second decoration layer 420 may include the same materials or similar materials. In addition, the first decoration layer 410 and the second decoration layer 420 may be formed through the same process or similar processes. In addition, the first decoration layer 410 and the second decoration layer 420 may include the same materials or similar materials.

The first decoration layer 410 may be interposed between the cover substrate 100 and the fingerprint sensor 500. Accordingly, the first decoration layer 410 may prevent external foreign matters from being infiltrated into the fingerprint sensor 500 through the cover substrate 100. In addition, the first decoration layer 410 is provided in the contact area between the fingerprint sensor 500 and the cover substrate 100 to improve the adhesion of the fingerprint sensor 500.

The fingerprint sensor 500 may be interposed between the first decoration layer 410 and the second decoration layer 420.

The fingerprint sensor 500 may be classified into an ultrasonic fingerprint sensor, an infrared fingerprint sensor, and a capacitive fingerprint sensor according to the operating principles thereof. The fingerprint sensor 500 may perform a predetermined function when an object is recognized as being in proximity of the fingerprint sensor 500 or a touch is recognized.

The second decoration layer 420 may be provided while surrounding the fingerprint sensor 500.

The first decoration layer 410 and the second decoration layer 420 may be provided with an equal thickness or a similar thickness, but the embodiment is not limited thereto. For example, the first decoration layer 410 and the second decoration layer 420 may be provided with mutually different thicknesses. In addition, one surface of the second decoration layer 420 and one surface of the active area AA of the cover substrate may be provided on the same plane. In addition, one surface of the second decoration layer 420 and one surface of the active area AA of the cover substrate 100 may have a step difference therebetween.

According to the touch window of the embodiment, after a step difference is formed between the active area and the inactive area of the cover substrate, the fingerprint sensor may be provided in the inactive area having a thinner thickness.

Accordingly, since the distance between a touch surface and the fingerprint sensor provided in the inactive area is shorter than that between the touch surface and the fingerprint sensor provided in the active area, the fingerprint sensor may be prevented from being erroneously operated.

In addition, since the entire area of the inactive area has the step difference from the active area, a stepped portion may be more prevented from being viewed from the outside, as compare with that in the case that a portion of the inactive area has a step difference from the active area.

In addition, since the decoration layer is provided in the stepped area to reduce the step difference, the stiffness of the cover substrate may be prevented from being weakened due to the step difference.

Hereinafter, a touch window according to another embodiment will be described with reference to FIG. 7

Figure 7:
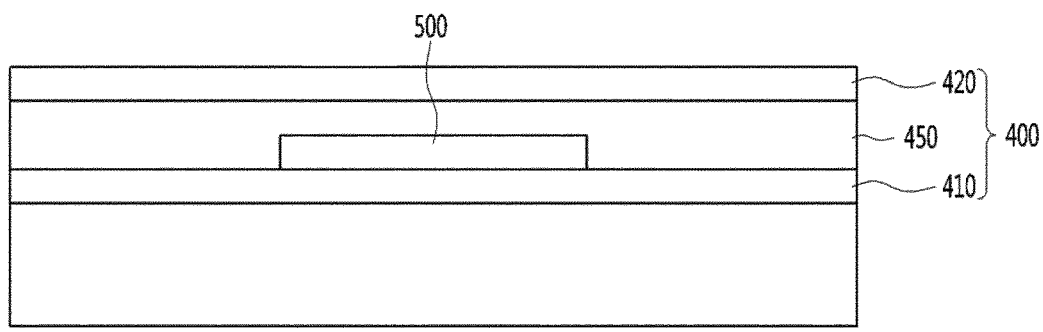
FIG. 7 is a sectional view taken along line B-B' of FIG. 3.
Figure 8:
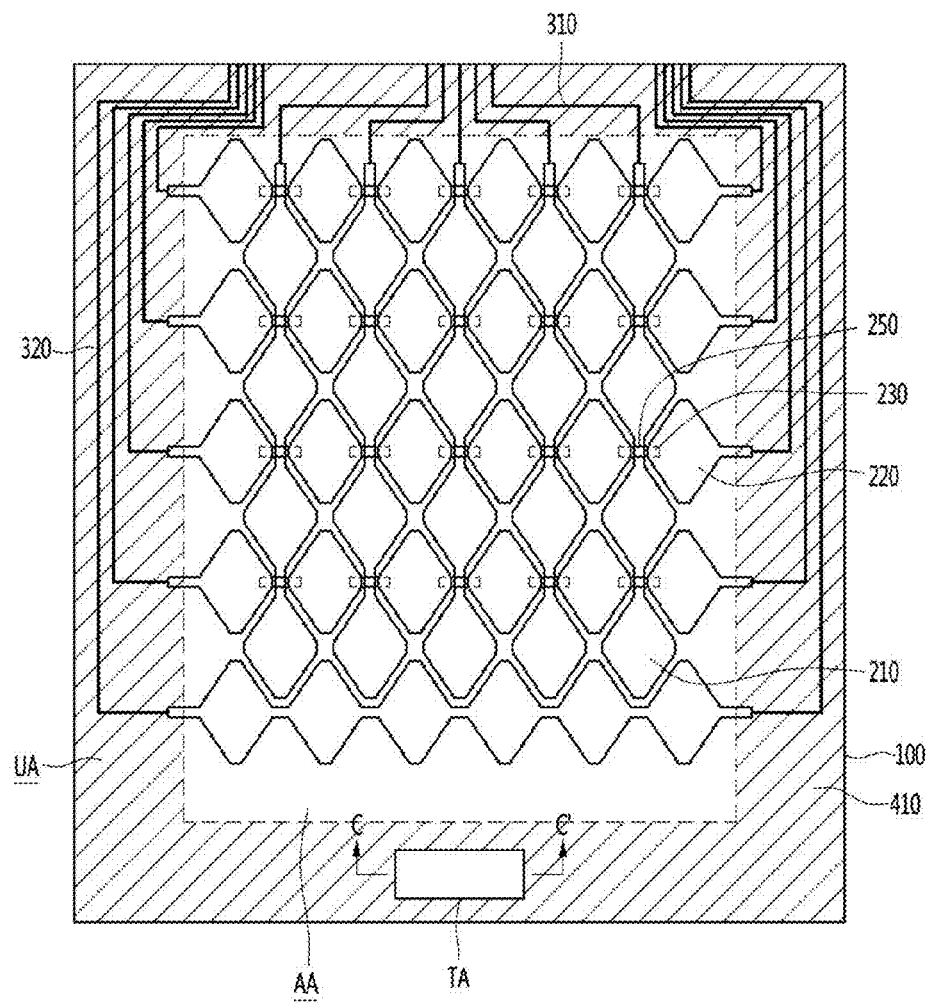
FIG. 8 is a plan view showing a touch window according to another embodiment.

Referring to FIG. 7, a plurality of decoration layers and a fingerprint sensor may be provided on the inactive area UA of the cover substrate 100.

The whole decoration layer 400 may be provided on the inactive area UA of the cover substrate 100.

The decoration layer 400 may include the first decoration layer 410 and the second decoration layer 420.

For example, the first decoration layer 410 may be provided on the inactive area UA of the cover substrate 100. In addition, the second decoration layer 420 may be provided on the first decoration layer 410.

Although FIG. 7 illustrates only both of the first decoration layer 410 and the second decoration layer 420, the embodiment is not limited thereto. A plurality of decoration layers may be additionally provided on the second decoration layer 420.

The first decoration layer 410 and the second decoration layer 420 may include mutually different materials. In addition, the first decoration layer 410 and the second decoration layer 420 may be formed through different processes.

For example, the first decoration layer 410 may be formed through a printing process using black or white pigments. The second decoration layer 420 may be formed using a base such as a film. In other words, the second decoration layer 420 may include a colored film having a shape corresponding to that of the inactive area of the cover substrate.

The first decoration layer 410 and the second decoration layer 420 may represent the same color or similar color.

In addition, an adhesive material 450 may be interposed between the first decoration layer 410 and the second decoration layer 420. The first decoration layer 410 and the second decoration layer 420 may be bonded to each other by the adhesive material 450. However, the embodiment is not limited thereto. For example, the first decoration layer 410 and the second decoration layer 420 may be bonded to each other in the direct contact therebetween.

Referring to FIG. 1, the sensing electrode 200 may be provided on the cover substrate 100. For example, the sensing electrode 200 may be provided on the active area AA of the cover substrate 100.

The sensing electrode 200 may include a first sensing electrode 210 and a second sensing electrode 220. The first sensing electrode 210 and the second sensing electrode 220 may extend in mutually different directions and may be provided on the cover substrate 100.

The first sensing electrode 210 may be provided on the active area AA of the cover substrate 100 while extending in one direction. In detail, the first sensing electrode 210 may be provided on one surface of the cover substrate 100.

In addition, the second sensing electrode 220 may extend in a direction different from the one direction on the active area AA of the cover substrate 100 and may be provided on one surface of the cover substrate 100. In other words, the first sensing electrode 210 and the second sensing electrode 220 may be provided on the same plane of the cover substrate 100 while extending in mutually different directions.

The first sensing electrode 210 and the second sensing electrode 220 may be provided on the cover substrate 100 to be insulated from each other. In detail, a plurality of first unit sensing electrodes constituting the first sensing electrode 210 are coupled to each other, and a plurality of second unit sensing electrodes constituting the second sensing electrode 220 may be spaced apart from each other. The second unit sensing electrodes may be coupled to each other by bridge electrodes 230. Insulating materials 250 may be provided in parts in which the bridge electrodes 230 are provided. Accordingly, the first sensing electrode 210 may be disconnected from the second sensing electrode 220.

Accordingly, the first sensing electrode 210 and the second sensing electrode 220 may be provided on the same surface of the cover substrate 100, that is, the same surface of the active area AA without making contact with each other while being insulated from each other.

The sensing electrode 200 may include a material corresponding to or similar to that of at least one of the first electrode 510 and the second electrode 520. In addition, at least one of the first sensing electrode 210 and the second sensing electrode 220 may be provided in the form of a mesh.

As the sensing electrode has the form of the mesh, the pattern of the sensing electrode may not be viewed on the active area AA. In addition, even if the sensing electrode is formed of metal, the pattern may not be viewed. Further, even if the sensing electrode is applied to a large-scaled touch window, the resistance of the touch window may be lowered. In addition, the sensing electrode and the wiring electrode may be simultaneously patterned by using the same material.

The wiring electrode 300 may be provided on the cover substrate 100. In detail, the wiring electrode 300 may be provided on at least of the active area AA and the inactive area UA of the cover substrate 100. Preferably, the wiring electrode 300 may be provided on the inactive area UA of the cover substrate 100.

The wiring electrode 300 may include a first wiring electrode 310 and a second wiring electrode 320. For example, the wiring electrode 300 may include the first wiring electrode 310 connected with the first sensing electrode 210 and the second wiring electrode 320 connected with the second sensing electrode 220.

The first wiring electrode 310 and the second wiring electrode 320 may be provided on the inactive area UA of the cover substrate 100. One end of the first wiring electrode 310 and one end of the second wiring electrode 320 are connected with the first sensing electrode 210 and the second sensing electrode 220, respectively. An opposite end of the first wiring electrode 310 and an opposite end of the second wiring electrode 320 may be connected with a circuit board. The circuit board may include various types of circuit boards. For examples, the circuit board may include a flexible printed circuit board (FPCB).

The first wiring electrode 310 and the second wiring electrode 320 may include conductive materials. For example, the wiring electrode 300 may include a material corresponding to or similar to that of the sensing electrode 200 described above.

The decoration layer 400 may be provided on the inactive area UA of the cover substrate 100. The decoration layer 400 may be formed by applying a material representing predetermined color to prevent the wiring electrode provided on the inactive area UA and a printed circuit board connecting the wiring electrode with an external circuit from being viewed from the outside.

Hereinafter, a touch window according to another embodiment will be described with reference to FIGS. 8 to 14.

The first decoration layer 410 may be provided on the inactive area UA. The first decoration layer 410 may be formed by applying a material representing predetermined color to prevent the wiring electrode provided on the inactive area UA and a printed circuit board connecting the wiring electrode with an external circuit from being viewed from the outside.

The first decoration layer 410 may represent color appropriate to a desired outer appearance. For example, the first decoration layer 410 may include black or white pigments to represent black or white. In addition, various colors, such as red and blue, may be realized by using various color films.

In addition, a desired logo may be formed on the first decoration layer 410 in various manners. The first decoration layer 410 may be formed through deposition, printing, wet coating, or adhering.

The first decoration layer 410 may be provided in at least one layer. For example, one decoration layer may be provided or at least two decoration layers having mutually different widths may be provided.

A touch area TA may be formed on the inactive area UA. For example, the touch area TA may be an area for recognizing the fingerprint of a finger.

Figure 9:
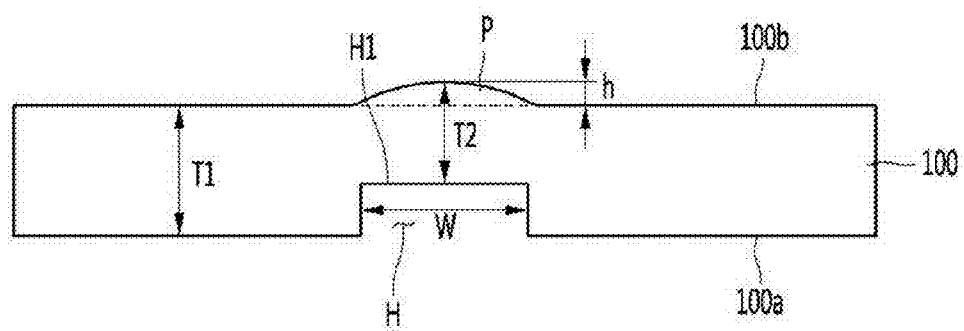
FIGS. 9 to 14 are sectional views showing a touch window taken along line C-C' of FIG. 1 according to a second embodiment.

Referring to FIG. 9, a receiving groove H may be formed in the touch area TA. In detail, the cover substrate 100 may include one surface 100*a* and an opposite surface 100*b*. For example, the cover substrate 100 may include the one surface 100*a* and the opposite surface 100*b* opposite to the one surface 100*a*.

The receiving groove H may be formed in the one surface 100*a* of the cover substrate 100. In addition, a protrusion part P may be formed on the opposite surface 100*b* of the cover substrate 100. In other words, the receiving groove H and the protrusion part P may be formed on the inactive area UA of the cover substrate.

The receiving groove H and the protrusion part P may be provided at positions overlapping with each other. In detail, a one-surface area of the cover substrate 100 having the receiving groove H may overlap with an opposite-surface area of the cover substrate 100 having the protrusion part P.

Although FIG. 9 shows that the one-surface area of the cover substrate 100 having the receiving groove H corresponds to the opposite-surface area of the cover substrate 100 having the protrusion part P, the embodiment is not limited thereto. The one-surface area of the cover substrate 100 having the receiving groove H may partially overlap with the opposite-surface area of the cover substrate 100 having the protrusion part P.

The thickness of the cover substrate 100 may be in the range of about 500 µm to about 600 µm. In detail, the distance between the one surface 100*a* of the cover substrate 100 and the opposite surface 100*b* of the cover substrate 100 may be in the range of about 500 µm to about 600 µm.

The receiving groove H may be formed with the height of about 50% or more of the thickness of the cover substrate 100.

The protrusion part P may be formed on the opposite surface of the cover substrate 100. The protrusion part P may be formed as the cover substrate 100 protrudes to a predetermined height from the opposite surface 100*b*. The protrusion part P may be formed with a curved surface on the opposite surface of the cover substrate 100. In other words, an outer surface of the protrusion part P may include a curved surface.

The distance from the bottom surface of the receiving groove receiving groove H to the outer surface of the protrusion part P may be 300 µm or less. In detail, the distance from the bottom surface of the receiving groove receiving groove H to the outer surface of the protrusion part P may be in the range of 100 µm to 300 µm. In more detail, the distance from the bottom surface of the receiving groove receiving groove H to the outer surface of the protrusion part P may be in the range of 150 µm to 300 µm.

In this case, the bottom surface H1 of the receiving groove may be a surface formed by connecting both lateral sides of the receiving groove.

If the distance from the bottom surface of the receiving groove receiving groove H to the outer surface of the protrusion part P is less than 100 µm, since the receiving groove H is formed by excessively etching the one surface of the cover substrate 100, the stiffness of the cover substrate 100 may be weakened, thereby degrading the reliability.

If the distance from the bottom surface of the receiving groove receiving groove H to the outer surface of the protrusion part P is more than 300 µm, the distance between the outer surface of the protrusion part P and the fingerprint sensor 500 is increased, the sensitivity to the fingerprint by the touch may be lowered.

The protrusion part P may enhance the stiffness of the substrate. In detail, the protrusion part P is formed on the area overlapping with the area having the receiving groove H to enhance the stiffness of the substrate area having the thickness reduced by the receiving groove. In other words, when force or pressure is applied toward the area having the receiving groove from the outside, the force or pressure may be dispersed by the protrusion part. Accordingly, the stiffness of the substrate may be enhanced.

The protrusion part P may be formed with the height having a predetermined size. In detail, the opposite surface 100*b* of the cover substrate may include the area having the protrusion part and an area having no the protrusion part.

A virtual line may be defined to extend from the area having the protrusion part while overlapping with at least one point of the outer surface of the protrusion part to be parallel to the opposite surface of the cover substrate 100 having no protrusion part.

In this case, the virtual extension line may be spaced apart from the opposite surface of the cover substrate having no the protrusion part by a predetermined distance. In other words, the height h of the protrusion part may be defined as the distance between the virtual extension line and the opposite surface of the cover substrate having no the protrusion part.

The height h of the protrusion part may be in the range of about 5 um to about 60 um. In detail, the height h of the protrusion part may be in the range of about 5 um to about 50 um. In more detail, the height h of the protrusion part may be in the range of about 5 um to about 20 um.

When the height h of the protrusion part may be less than about 5 um, the protrusion part may not sufficiently reinforce the stiffness of the cover substrate, which is weakened as the receiving groove H is formed. Accordingly, the substrate may still represent weakened stiffness. When the height h of the protrusion part may be more than about 60 um, the protrusion part may be viewed from the outside and sensitivity deviation of sensing may be increased depending on the height of the protrusion part.

Further, in the case of the protrusion part P, the height h may be reduced outward from the center of the protrusion part.

Figure 10:
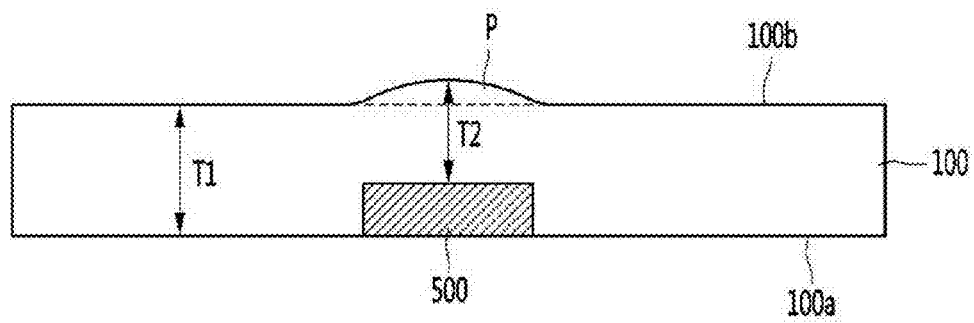

Referring to FIG. 10, the fingerprint sensor 500 may be provided in the receiving groove H. In detail, the fingerprint sensor 500 may be received in the receiving groove H.

The fingerprint sensors 500 may include various fingerprint sensors provided according to the operating principles. In detail, the fingerprint sensor 500 may include various fingerprint sensors provided according to various operating principles, such as an ultrasonic operating principle, an infrared operating principle, and a capacitive operating principle.

In the touch area TA, the fingerprint sensor 500 may sense the fingerprint to perform various operations based on the recognition of the fingerprint.

Figure 11:
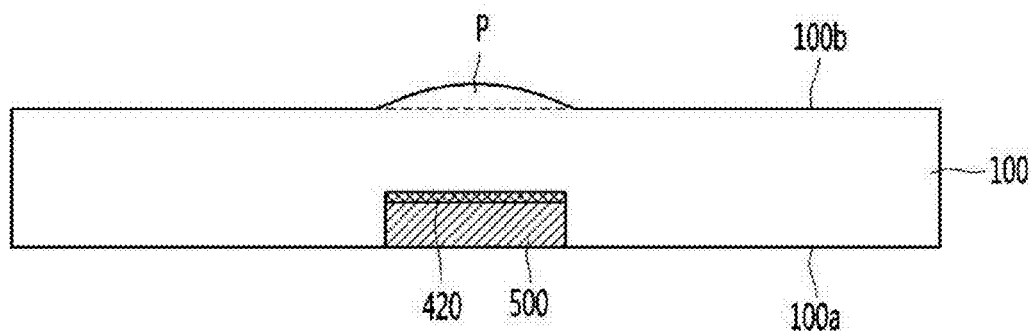

Referring to FIG. 11, a decoration layer may be further provided in the receiving groove H. In detail, the second decoration layer 420 may be provided in the receiving groove H, and the fingerprint sensor 500 may be provided on the fingerprint sensor 500.

The second decoration layer 420 may prevent the fingerprint sensor 500 from being viewed from the outside.

The second decoration layer 420 may be formed through a process the same or similar to that of the first decoration layer 410.

The first decoration layer 410 and the second decoration layer 420 may be formed in the same color or similar color. As the first decoration layer 410 and the second decoration layer 420 are formed in the same color or similar color, the sense of unity may be formed in areas in which the first decoration layer 410 and the second decoration layer 420 are provided.

In addition, the first decoration layer 410 may be formed in color different from that of the second decoration layer 420. As the first decoration layer 410 and the second decoration layer 420 are formed in different colors, the area of the first decoration layer 410 and the area of the second decoration layer 420 may be distinguished therebetween. Accordingly, the area in which the fingerprint sensor 500 is provided may be distinguished from the outside.

Figure 12:
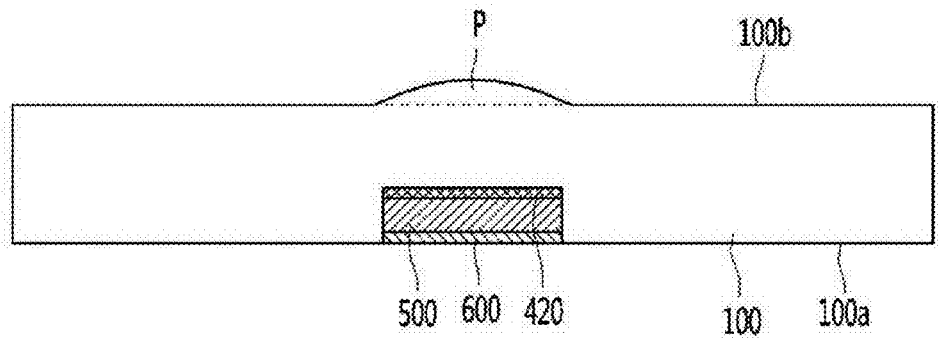

Referring to FIG. 12, a protective layer 600 may be further provided in the receiving groove H. In detail, the second decoration layer 420 may be provided in the receiving groove H, the fingerprint sensor 500 may be provided on the second decoration layer 420, and the protective layer 600 may be provided on the second fingerprint sensor 500.

The protective layer 600 may include a resin material. The protective layer 600 may be provided to directly make contact with the fingerprint sensor 500.

One surface of the protective layer 600 and the one surface 100b of the cover substrate 100 may be provided on the same plane. In detail, the protective layer 600 may include a first surface facing the fingerprint sensor 500 and a second surface opposite to the first surface. The second surface and the one surface 100a of the cover substrate 100 may be provided on the same plane.

Accordingly, on the one surface 100a of the cover substrate 100, the step difference formed by the receiving groove H may be removed. Accordingly, when another substrate is bonded to the cover substrate 100, the bonding failure resulting from the step difference may be prevented.

In addition, the protective layer 600 may prevent the fingerprint sensor 500 from being exposed to external moisture or oxygen and thus corroded.

Figure 13:
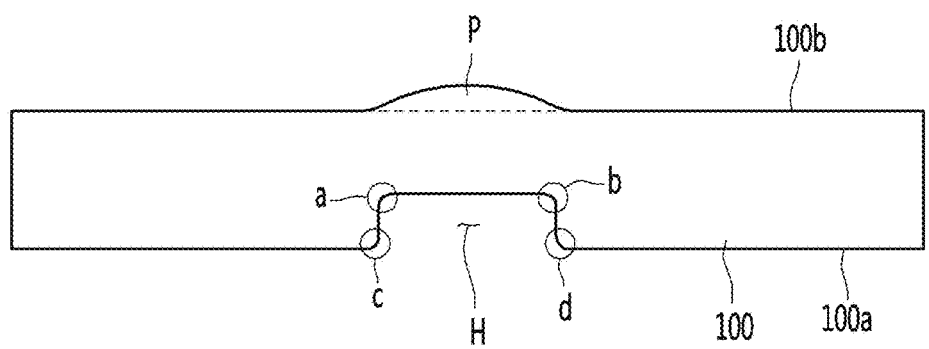

Referring to FIG. 13, the receiving groove H may have a curved surface. In detail, at least one surface of the receiving groove H may have a curved surface. For example, the receiving groove H may include corner areas "a" and "b" formed on the bottom surface thereof and corner areas "c" and "d" formed on the top surface thereof. The curved surface may be included at least one of the corner areas "a" and "b" formed on the bottom surface of the receiving groove H and the corner areas "c" and "d" formed on the top surface of the receiving groove H.

As the receiving groove H includes a curved surface, the degree of freedom may be improved in the design of the fingerprint sensor provided in the receiving groove H. In addition, the decoration layer or the protective layer may be easily formed.

Figure 14:
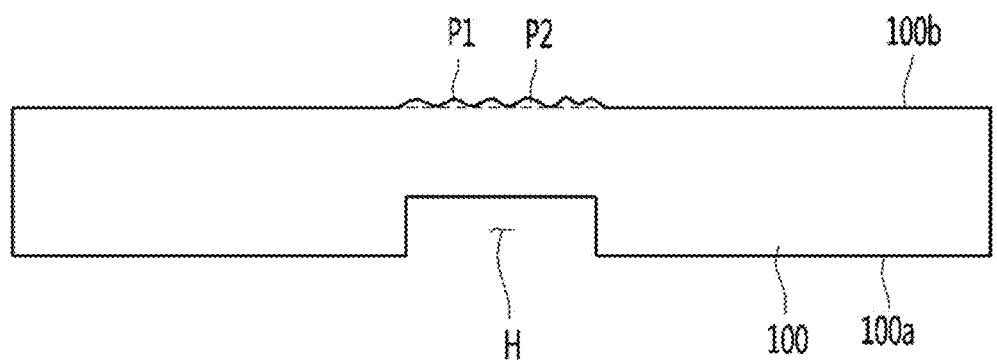

Referring to FIG. 14, at least one protrusion part may be formed on the opposite surface 100b of the cover substrate 100. In detail, a plurality of protrusion parts may be formed on the opposite surface 100b of the cover substrate 100. In other words, a plurality of protrusion parts may be formed on the opposite surface 100b of the cover substrate 100 to disperse external force or pressure applied to the cover substrate 100.

Hereinafter, the fingerprint sensor according to the embodiment will be described with reference to FIGS. 15 to 25.

Referring to FIGS. 15 to 25, the fingerprint sensor according to the embodiment may include the substrate 501, the first electrode 510, the second electrode 520, and a piezoelectric layer 800.

The substrate 501 may be provided on the cover substrate 100. The substrate 501 may support the piezoelectric layer 800, the first electrode 510, and the second electrode 520.

The substrate 501 may include a material the same as or similar to that of the cover substrate 100. In addition, the sectional area of the substrate 501 may be equal to or less than that of the cover substrate 100. For example, the sectional area of the substrate 501 may be less than that of the cover substrate 100.

The piezoelectric layer 800 may be provided on the substrate 501. The piezoelectric layer 800 may include a piezoelectric film. For example, the piezoelectric layer 800 may include a transparent piezoelectric film, a semi-transparent piezoelectric film, or an opaque piezoelectric film.

The piezoelectric layer 800 may include various piezoelectric materials. For example, the piezoelectric layer 800 may include single crystal ceramics, polycrystalline ceramics, a polymer material, a thin film material, and a composite material of a polycrystalline material and a polymer material.

The piezoelectric material of the single crystal ceramics may include α-AlPO$_4$, α-SiO$_2$, LiTiO$_3$, LiNbO$_3$, Sr$_x$Ba$_y$Nb2O$_3$, Pb$_5$—Ge$_3$O$_{11}$, Tb$_2$(MnO4)$_3$, Li$_2$B$_4$O$_7$, CdS, ZnO, Bi$_{12}$SiO$_{20}$ or Bi$_{12}$GeO$_{20}$.

The piezoelectric material of the polycrystalline ceramics may include a PZT-based material, a PT-based material, a PZT-complex perovskite-based material, or BaTiO$_3$.

In addition, the polymer piezoelectric material may include PVDF, P(VDF-TrFe), P(VDFTeFE) or TGS.

In addition, the piezoelectric material of the thin film material may include ZnO, CdS or AlN.

Further, the piezoelectric material of the composition material may include PZT-PVDF, PZT-Silicone Rubber, PZT-Epoxy, PZT-foamed polymer, or PZT-foamed urethane.

The piezoelectric layer 800 according to the embodiment may include a polymer piezoelectric material. For example, the piezoelectric layer 800 according to the first embodiment may include a piezoelectric material including at least one of PVDF, P(VDF-TrFe) and P(VDFTeFE).

Figure 16:
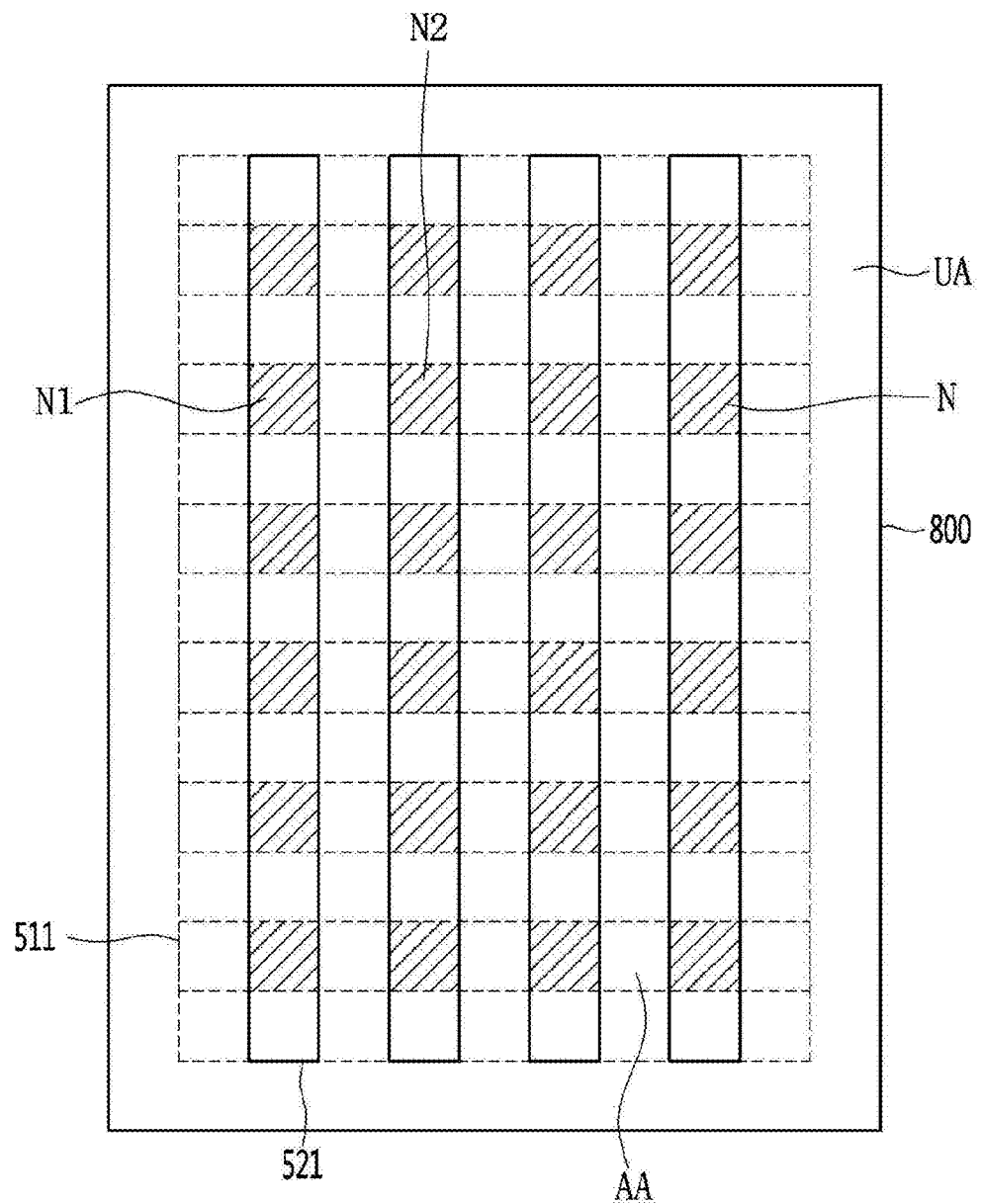
FIG. 16 is a plan view showing the fingerprint sensor according to the embodiment.

Referring to FIG. 16, the active area AA and the inactive area UA may be defined in the piezoelectric layer 800.

The active area AA may be an area in which the fingerprint is recognized. In addition, the inactive area UA provided adjacent to the active area AA may be an area in which the fingerprint is not recognized.

In detail, if a finger approaches the active area AA or makes contact with the active area AA, the fingerprint may be recognized in the active area AA by transmitted and received ultrasonic signal. The operating principle of the fingerprint sensor will be described below.

The first electrode 510 and the second electrode 520 may be provided on the piezoelectric layer 800. For example, the first electrode 510 and the second electrode 520 may be provided on at least one of one surface and an opposite surface of the piezoelectric layer 800.

Figure 15:
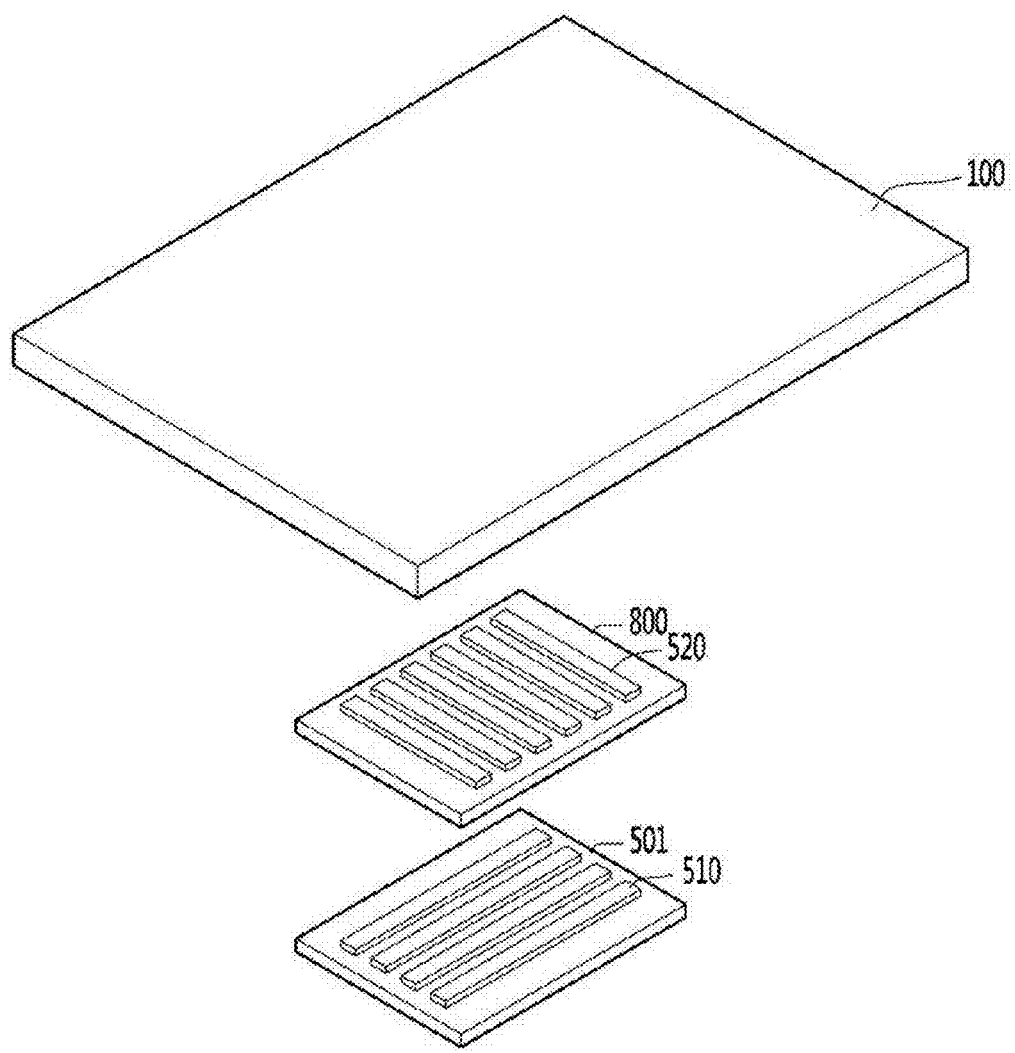
FIG. 15 is a perspective view showing the fingerprint sensor according to the embodiment.

Referring to FIGS. 15 and 16, the first electrode 510 may be provided on the one surface of the piezoelectric layer 800 and the second electrode 520 may be provided on the opposite surface of the piezoelectric layer 800. In other words, the first electrode 510 and the second electrode 520 may be provided on both surfaces of the piezoelectric layer 800, respectively. In other words, the piezoelectric layer 800 may be interposed between the first electrode 510 and the second electrode 520.

The structure of an electrode layer according to the embodiment is not limited to that of FIG. 1, but the electrode layer may have various structures as long as the piezoelectric layer 800 is interposed between the first electrode 510 and the second electrode 520. For example, another layer may be interposed between the first electrode 510 and the piezoelectric layer 800 or between the second electrode 520 and the piezoelectric layer 800.

At least one of the first electrode 510 and the second electrode 520 may include a conductive material.

For example, the at least one of the first electrode 510 and the second electrode 520 may include a transparent conductive material. For example, the at least one of the first electrode 510 and the second electrode 520 may include a metallic oxide, such as indium tin oxide (ITO), indium zinc oxide (IZO), copper oxide, tin oxide, zinc oxide, or titanium oxide.

In addition, the at least one of the first electrode 510 and the second electrode 520 may include a nanowire, a photosensitive nanowire film, a carbon nanotube (CNT), graphene, conductive polymer or a mixture thereof.

Alternatively, the at least one of the first electrode 510 and the second electrode 520 may include various metals. For example, at least one of the first electrode 510 and the second electrode 520 may include at least one of Cr, Ni, Cu, Al, Ag, Mo, Au, T1 and the alloy thereof.

In addition, at least one of the first electrode 510 and the second electrode 520 may be formed in a mesh shape. In detail, at least one of the first and second electrodes 510 and 520 may have a mesh shape by sub-electrodes crossing each other.

The first electrode 510 and the second electrode 520 may have mesh line widths in the range of about 0.1 μm to about 10 μm. When the width of the mesh line is less than about 0.1 μm, it may be impossible to form the width of the mesh line in the manufacturing process or mesh lines may be shorted. When the width of the mesh line is more than about 10 μm, the electrode pattern may be viewed from the outside and thus the visibility may be deteriorated. Preferably, the line width of the mesh line (LA) may be in the range of about 0.5 μm to about 7 μm. More preferably, the line width of the mesh line may be in the range of about 1 μm to about 3.5 μm.

The first electrode 510 and the second electrode 520 may be provided in the mesh shape through various manners.

For example, after depositing a metallic layer on at least one surface of the piezoelectric layer 800 by using an electrode material, such as copper (Cu), constituting the first electrode 510 and the second electrode 520, the metallic layer is etched in the mesh shape, thereby forming the first electrode and the second electrode. Alternatively, after disposing a base substrate, such as a resin layer, on at least one surface of the piezoelectric layer 800, an intaglio or embossment pattern may be formed on the resin layer by using an intaglio or embossment mold. Thereafter, a metallic paste including metal may be filled in the pattern and cured. Therefore, the first electrode and the second electrode having the intaglio or embossment mesh shape may be formed.

The first electrode 510 and the second electrode 520 may be connected with wiring electrodes arranged on the inactive area UA. The wiring electrodes may be connected with a printed circuit board (shown in drawings) provided on the inactive area UA.

The first electrode 510 and the second electrode 520 may cross each other. In detail, the first electrode 510 may include at least one first electrode pattern 511 extending in one direction and the second electrode 520 may include at least second electrode pattern 521 extending in a direction different from the one direction.

Although FIGS. 15 and 16 illustrate that the first electrode pattern 511 and the second electrode pattern 521 are formed in a bar pattern, the embodiment is not limited. The first electrode pattern 511 and the second electrode pattern 521 may have patterns in various shapes such as a rectangle, a diamond, a pentagon, a hexagon or a circular shape.

Accordingly, the first electrode 510 and the second electrode 520 may extend in directions different from each other, and a node area N may be formed at a cross area between the first electrode pattern 511 and the second electrode pattern 521.

In the node area N, a signal may be transmitted or received by an object approaching the piezoelectric layer 800 or making contact with the piezoelectric layer 800. In detail, an ultrasonic signal may be transmitted and received in the node area N. In other words, the node area N may have a sensor which recognizes a fingerprint as the finger approaches the node area N or makes contact with the node area N.

At least one node area N may be formed on the piezoelectric layer 800. In detail, a plurality of node areas N may be formed on the piezoelectric layer 800. For example, the node area N may be formed with the resolution in the range of about 400 dpi to about 500 dpi with respect to the piezoelectric layer 800.

In addition, the interval between the node areas N may be about 100 μm or less. For example, the node area N may include a first node area N and a second node area N2 adjacent to each other. The first node area N may be spaced apart from the second node area N2 by a distance of about 100 μm or less.

For example, at least one of the first distance between the first electrode patterns 511 and the second distance between the second electrode patterns 521 may be about 100 μm or less, in detail, about 70 μm or less, in more detail, about 50 μm or less, wherein the first electrode pattern 511 and the second electrode pattern 521 form the node area N.

When the distance between the node areas N goes beyond the range, the resolution of the node areas N may be lowered. Accordingly, the ultrasonic signal transmitted and received in the node areas N may be weakened and thus the fingerprint may not be exactly recognized. Accordingly, the reliability of the fingerprint sensor may be degraded.

The node areas N may simultaneously transmit and receive the ultrasonic signal. In detail, when the finger approaches or makes contact with the node area N, the ultrasonic signal may be transmitted toward the finger in the node area N. Ultrasonic signals reflected from the finger may be received in the node area N. The fingerprint sensor according to the embodiment may recognize the fingerprint of the finger due to the difference between the transmitted signal and the received signal.

Figure 17:
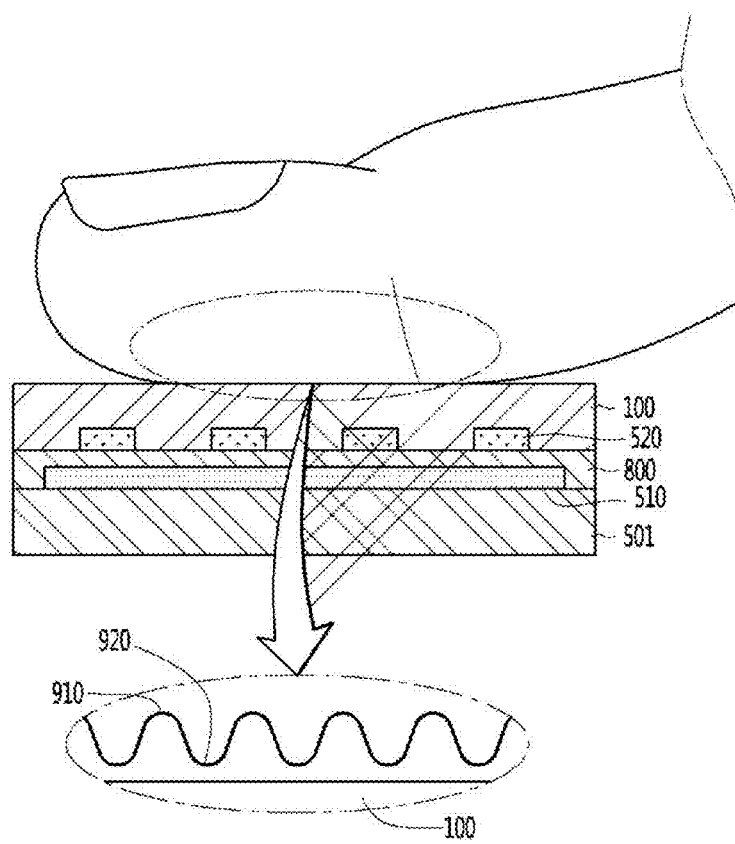
FIG. 17 is a sectional view to explain the operating principle of the fingerprint sensor according to the embodiment.

FIG. 17 is a sectional view to explain the operation of the fingerprint sensor as a finger approaches or makes contact with the fingerprint sensor.

Referring to FIG. 17, as a voltage having a resonance frequency in an ultrasonic band is applied to the first electrode 510 and the second electrode 520, which are provided on one surface and an opposite surface of the piezoelectric layer 800, respectively, from an external controller, the piezoelectric layer 800 may generate an ultrasonic signal.

Regarding the ultrasonic signal, when the finger does not make contact with or approach the fingerprint sensor, there may be made an acoustic impedance difference between air and the node area N of the piezoelectric layer 800 generating the ultrasonic signal. Accordingly, the most parts of the ultrasonic signal transmitted from the node area N of the piezoelectric layer 800 fail to pass through the interface between the piezoelectric layer 800 and the air and thus may return into the piezoelectric layer 800.

Meanwhile, as shown in FIG. 17, when the finger makes contact with or approaches the fingerprint sensor, part of the ultrasonic signal transmitted from the node area N of the piezoelectric layer 800 may be transmitted into the finger through the boundary surface between the skin of the finger and the piezoelectric layer 800. Accordingly, the intensity of a signal reflected and returning to the piezoelectric layer 800 may be lowered and thus a fingerprint pattern may be sensed.

The fingerprint of the finger may have a pattern formed by repeating numerals ridges and valleys although a user cannot recognize the numerals ridges and valleys with the naked eyes. As the ridges and the valleys are repeated, the height difference of the pattern may be made. Accordingly, as shown in FIG. 17, the piezoelectric layer 800 does not directly make contact with the skin in the valley 910 of the fingerprint. In addition, the piezoelectric layer 800 may directly make contact with the skin of the piezoelectric layer 800 in the ridge 920 of the fingerprint.

Accordingly, in the case of the ultrasonic signal transmitted from the node area N of the piezoelectric layer 800 corresponding to the valley 910 of the fingerprint, only extremely less part of the ultrasonic signal may be emitted and the most parts of the ultrasonic signal are reflected into the piezoelectric layer 800 to be received into the node area N. In the case of an ultrasonic signal transmitted from the node area of the piezoelectric layer 800 corresponding to the ridge 920 of the fingerprint, significant part of the ultrasonic signal passes through the boundary surface of the finger and travels into the finger, and the intensity of the ultrasonic signal reflected from the finger and received in the node area N may be relatively greatly reduced.

Accordingly, in each node area N, the fingerprint pattern of the finger may be detected by measuring the intensity or the reflectance of a reflected signal, which is received, based on an ultrasonic signal generated due to an acoustic impedance difference between the valley 910 and the ridge 920 of the fingerprint.

FIGS. 18 to 25 are sectional views showing the fingerprint sensor according to various embodiments.

Figure 18:
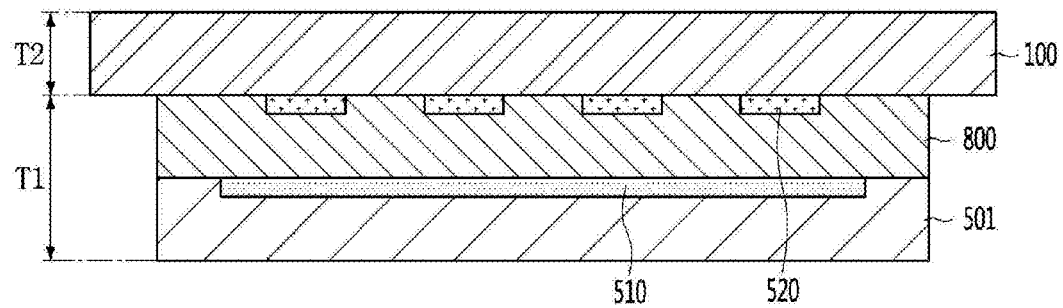
FIGS. 18 to 25 are sectional views showing the fingerprint sensor according to various embodiments.

Referring to FIG. 18, a fingerprint sensor according to the embodiment may include a cover substrate 100 and an electrode layer. In other words, according to the embodiment, the fingerprint sensor may include the cover substrate 100 and the electrode layer including a substrate 501, a piezoelectric layer 800, a first electrode 510, and a second electrode 520.

In addition, the thickness T1 of the electrode layer may be in the range of about 50 μm to about 700 μm. In detail, the thickness T1 of the electrode layer may be in the range of about 100 μm to about 400 μm. In more detail, the thickness T1 of the electrode layer may be in the range of about 100 μm to about 200 μm.

When the thickness T1 of the electrode layer is less than about 50 μm, the endurance of the electrode layer may be deteriorated and thus the electrode layer may be broken by external impact. Accordingly, the reliability of the fingerprint sensor 500 may be degraded. In addition, when the thickness T1 of the electrode layer is more than about 700 μm, the sensitivity based on the contact of the fingerprint may be lowered due to the thickness of the fingerprint sensor. Accordingly, the efficiency of the fingerprint sensor may be lowered.

In addition, the thickness T2 of the cover substrate 100 may be about 200 μm or less. In detail, the thickness T2 of the cover substrate 100 may be in the range of about 100 μm to about 200 μm. In more detail, the thickness T2 of the cover substrate 100 may be in the range of about 120 μm to about 170 μm.

When the thickness of the cover substrate 100 may be more than about 200 μm, the sensitivity based on the contact of the fingerprint is lowered due to the thickness of the cover substrate. Accordingly, the efficiency of the fingerprint sensor may be lowered. In addition, when the thickness of the cover substrate 100 may be less than about 100 μm, the endurance of the cover substrate may be deteriorated and thus the cover substrate 100 may be broken by external impact. Accordingly, the reliability of the fingerprint sensor 500 may be degraded.

Figure 19:
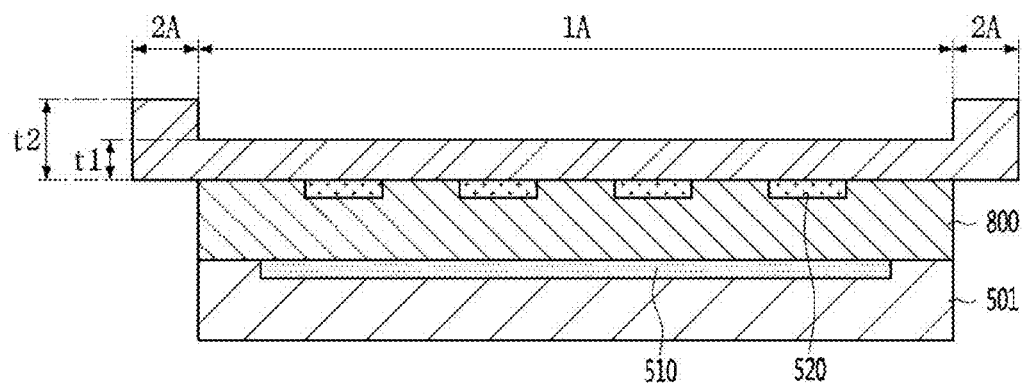

Referring to FIG. 19, in a fingerprint sensor according to another embodiment, the whole thickness of the cover substrate 100 may become irregular. For example, the cover substrate 100 may be divided into a first area 1A and a second area 2A according to the arrangement locations of the electrode layer.

In detail, the cover substrate 100 may include a first area 1A, which is an area having the electrode layer, that is, an area overlapping with a part having the electrode layer, and second areas 2A which are areas having no electrode layer, that is, areas adjacent to the first area 1A.

The thickness t1 of the first area 1A and the thickness t2 of the second area 2A may be different from each other. For example, the thickness t1 of the first area 1A may be thinner than the thickness t2 of the second area 2A. For example, the thickness t1 of the first area 1A may be about 200 μm or less. In detail, the thickness t1 of the first area 1A may be in the range of about 100 μm to about 200 μm. In more detail, the thickness t1 of the first area 1A may be in the range of about 120 in to about 170 μm.

When the thickness t1 of the first area 1A may be more than about 200 μm, the sensitivity based on the contact of the fingerprint is lowered due to the thickness of the cover substrate in the area having the electrode layer. In addition, the thickness t1 of the first area 1A is less than about 100 μm, the endurance of the cover substrate may be deteriorated and thus the cover substrate may be broken by external impact. Accordingly, the reliability of the fingerprint sensor may be degraded.

Figure 20:
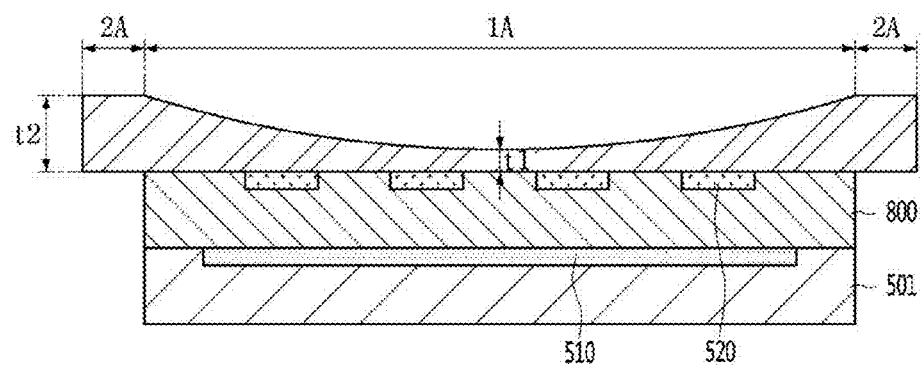

Referring to FIG. 20, in a fingerprint sensor according to another embodiment, the whole thickness of the cover substrate 100 may become irregular. For example, the cover substrate 100 may be divided into a first area 1A and a second area 2A according to the arrangement locations of the electrode layer.

In detail, the cover substrate 100 may include a first area 1A, which is an area having the electrode layer, that is, an area overlapping with a part having the electrode layer, and second areas 2A which are areas having no electrode layer, that is, areas adjacent to the first area 1A.

In addition, at least one surface of the cover substrate 100 may include a curved surface. For example, at least one of the first area 1A and the second area 2A may include a curved surface. For example, as shown in FIG. 20, the first area 1A may include a curved surface. In other words, the area of the cover substrate 100 corresponding to the area having the electrode layer may include the curved surface.

In detail, the first area 1A may have a curved surface which extends from one end of the first area 1A to an opposite end of the second area 1A and increases the thickness of the cover substrate 100 after decreasing the thickness of the cover substrate 100.

Accordingly, the first area 1A and the second area 2A may have mutually different thicknesses. In detail, the thickness t1 of the first area 1A may be thinner than the thickness t2 of the second area.

Accordingly, as the thickness of the cover substrate is reduced in the area having the electrode layer, when a fingerprint makes contact with one surface of a cover substrate and a signal is generated, the moving distance of the signal to the fingerprint sensor may be reduced. Accordingly, the sensitivity based on the contact of the fingerprint may be improved and thus the efficiency of the fingerprint print sensor may be improved.

Figure 21:
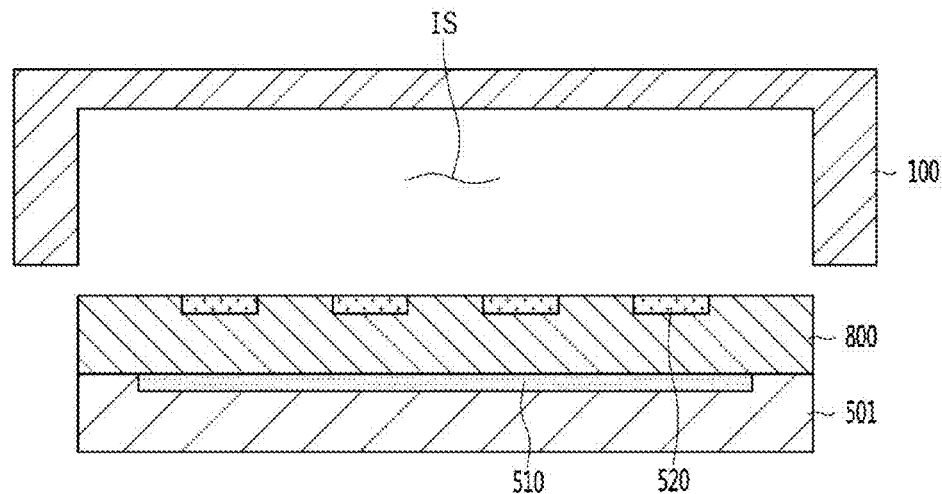
Figure 22:
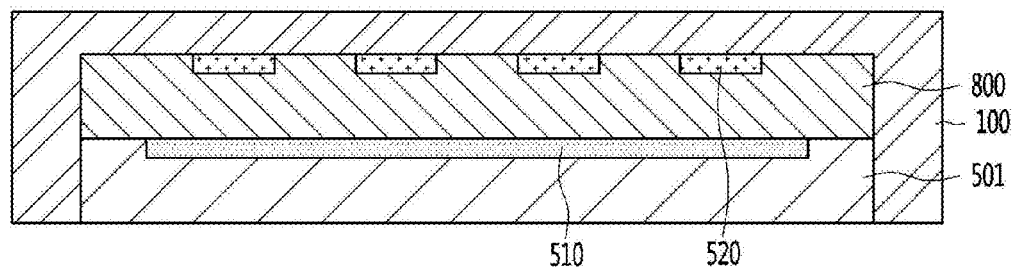

Referring to FIGS. 21 and 22, in a fingerprint sensor according to another embodiment, the cover substrate 100 may include a receiving part.

A receiving part IS may be formed in the shape of a groove in one surface of the cover substrate 100. For example, a groove in the shape of intaglio is formed in the one surface of the cover substrate 100 facing the electrode layer to form the receiving part IS.

Referring to FIG. 22, the electrode layer may be provided in the receiving groove. In other words, the electrode layer may be inserted into the receiving groove. For example, the entire portion of the electrode layer may be inserted into the receiving groove. Accordingly, lateral sides and a top surface of the electrode layer may be provided to make contact with the cover substrate.

Accordingly, the thickness of the cover substrate may be reduced in the area having the electrode layer. Accordingly, when the fingerprint makes contact with one surface of the cover substrate to generate a signal, the moving distance of the signal to the fingerprint sensor may be reduced. Accordingly, the sensitivity based on the contact of the fingerprint may be improved and thus the efficiency of the fingerprint sensor may be improved.

In addition, as the thickness in the edge of the cover substrate may be thicker than that of the receiving part, the endurance of the cover substrate may be prevented from being deteriorated and thus the cover substrate may be prevented from being broken by external impact.

Figure 23:
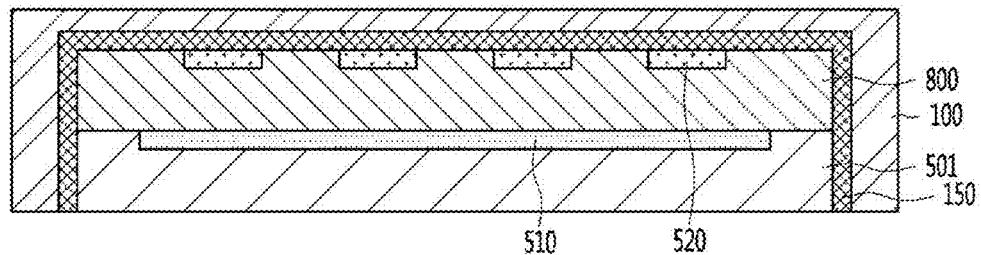

Referring to FIG. 23, in a fingerprint sensor according to another embodiment, the cover substrate 100 may include a receiving part.

A receiving part may be formed in the shape of a groove in one surface of the cover substrate 100. For example, a groove in the shape of intaglio is formed in the one surface of the cover substrate 100 facing the electrode layer to form the receiving part IS.

In addition, the electrode layer may be provided in the receiving groove. In other words, the electrode layer may be inserted into the receiving groove. For example, the entire portion of the electrode layer may be inserted into the receiving groove. Accordingly, lateral sides and a top surface of the electrode layer may be provided to make contact with the cover substrate.

In addition, a resin layer 150 may be interposed between the electrode layer and the area making contact with the cover substrate 100. For example, the resin layer 150 may be provided on the contact surface between the top surface and the lateral sides of the electrode layer and the receiving part of the cover substrate 100.

The resin layer 150 may transparent. For example, the resin layer 150 may include silicone resin, epoxy resin, or urethane resin.

Accordingly, the thickness of the cover substrate may be reduced in an area having the electrode layer. Accordingly, when the fingerprint makes contact with one surface of the cover substrate to generate a signal, the moving distance of the signal to the fingerprint sensor may be reduced. Accordingly, the sensitivity based on the contact of the fingerprint may be improved and thus the efficiency of the fingerprint sensor may be improved.

In addition, as the thickness in the edge of the cover substrate may be thicker than that of the receiving part, the endurance of the cover substrate may be prevented from being deteriorated and thus the cover substrate may be prevented from being broken by external impact.

In addition, as the resin layer 150 may be provided on the contact surface, the resin layer 150 may prevent external foreign matters, which are to be introduced through the cover substrate 100, from being infiltrated into the electrode layer, that is, the fingerprint sensor. In addition, the resin layer 150 may serve as a protective layer.

In addition, the resin layer 150 may be provided on the contact surface to improve the adhesion between the cover substrate 100 and the electrode layer, that is, the fingerprint sensor. In addition, the resin layer 150 may serve as an adhesion reinforcement layer.

Figure 24:
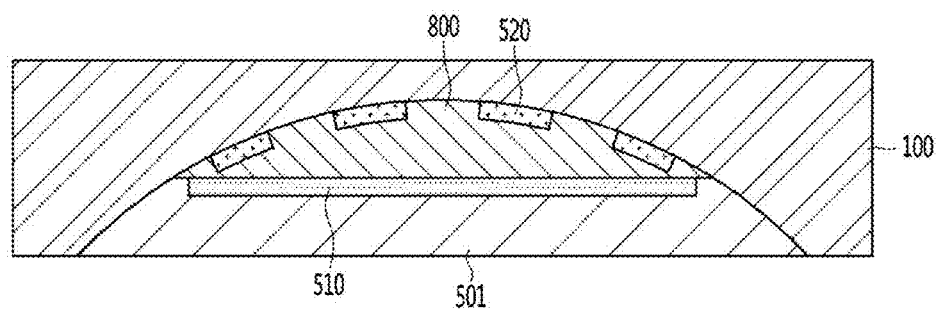
Figure 25:
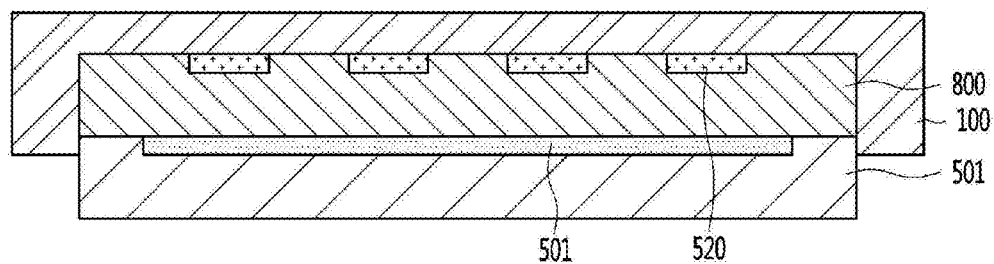

Referring to FIG. 24, in a fingerprint sensor according to another embodiment, the cover substrate 100 may include a receiving part.

A receiving part may be formed in the shape of a groove in one surface of the cover substrate 100. For example, a groove in the shape of intaglio is formed in the one surface of the cover substrate 100 facing the electrode layer to form the receiving part IS.

In addition, the electrode layer may be provided in the receiving groove. In other words, the electrode layer may be inserted into the receiving groove. For example, the entire portion of the electrode layer may be inserted into the receiving groove. Accordingly, lateral sides and a top surface of the electrode layer may be provided to make contact with the cover substrate.

The receiving part may include a curved surface which extends from one end of the receiving part to an opposite end of the receiving part and increases the thickness of the cover substrate 100 after decreasing the thickness of the cover substrate 100.

In addition, although not shown, a resin layer further may be further provided on the contact surface between the top surface and the lateral sides of the electrode layer and the receiving part of the cover substrate 100 as shown in FIG. 24.

Accordingly, as the receiving part includes a curved surface, the thickness of the cover substrate may be reduced in an area having the electrode layer. Accordingly, when the fingerprint makes contact with one surface of the cover substrate to generate a signal, the moving distance of the signal to the fingerprint sensor may be reduced. Accordingly, the sensitivity based on the contact of the fingerprint may be improved and thus the efficiency of the fingerprint sensor may be improved.

In addition, as the thickness in the edge of the cover substrate may be thicker than that of the receiving part, the endurance of the cover substrate may be prevented from being deteriorated and thus the cover substrate may be prevented from being broken by external impact.

Referring to FIG. 24, in a fingerprint sensor according to another embodiment, the cover substrate 100 may include a receiving part.

A receiving part may be formed in the shape of a groove in one surface of the cover substrate 100. For example, a groove in the shape of intaglio is formed in the one surface of the cover substrate 100 facing the electrode layer to form the receiving part IS.

In addition, the electrode layer may be provided in the receiving groove. In other words, the electrode layer may be inserted into the receiving groove. For example, the electrode layer may be partially inserted into the receiving groove. Accordingly, lateral sides and a top surface of the electrode layer may be provided to make contact with the cover substrate.

For example, although not shown, a resin layer may be further provided on the contact surface between the top surface and the lateral sides of the electrode layer and the receiving part of the cover substrate 100 as shown in FIG. 24.

Accordingly, the thickness of the cover substrate may be reduced in an area having the electrode layer. Accordingly, when the fingerprint makes contact with one surface of the cover substrate to generate a signal, the moving distance of the signal to the fingerprint sensor may be reduced. Accordingly, the sensitivity based on the contact of the fingerprint may be improved and thus the efficiency of the fingerprint sensor may be improved.

In addition, as the thickness in the edge of the cover substrate may be thicker than that of the receiving part, the endurance of the cover substrate may be prevented from being deteriorated and thus the cover substrate may be prevented from being broken by external impact.

Figure 26:
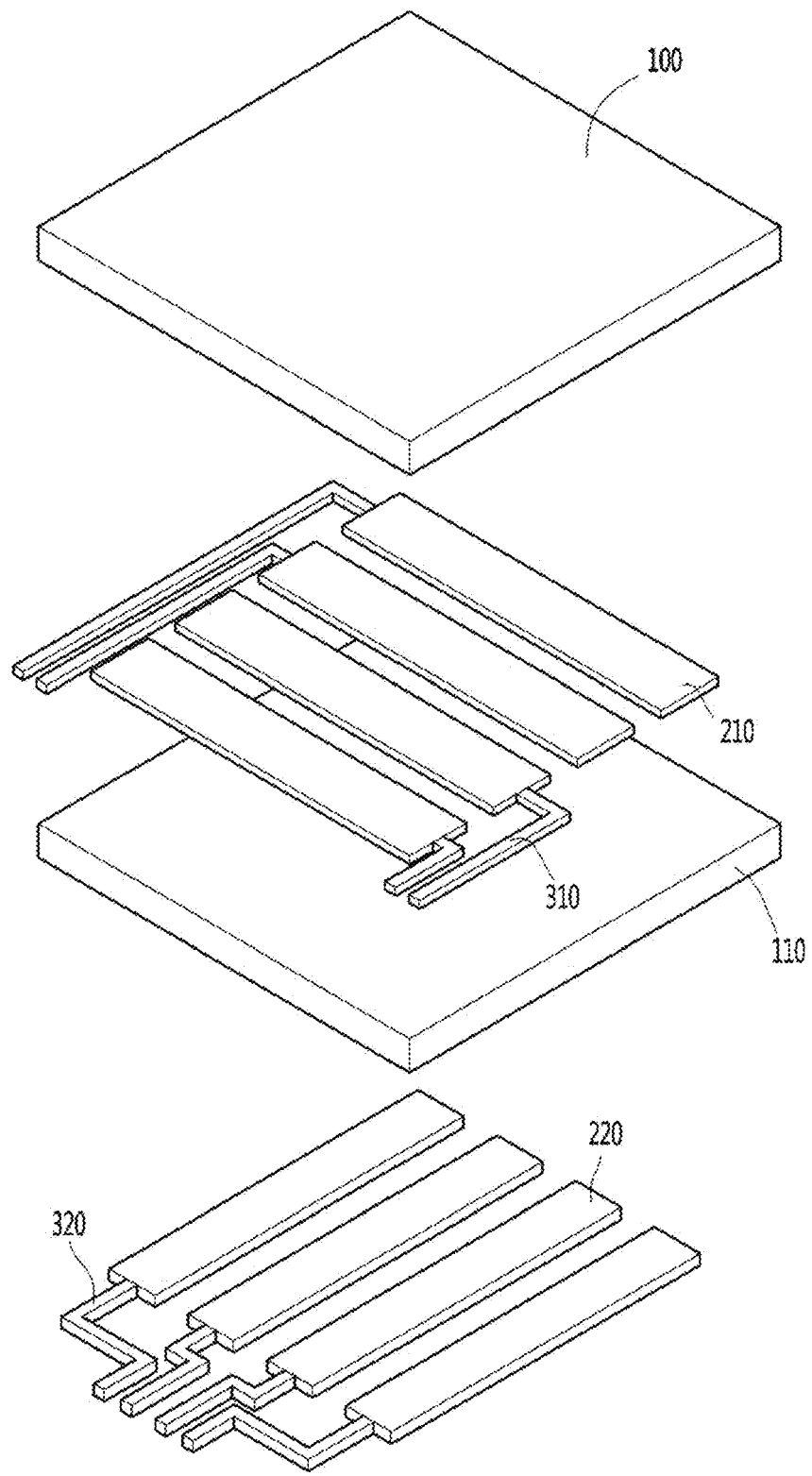
FIGS. 26 to 28 are views to explain various types of touch windows according to the embodiment.
Figure 27:
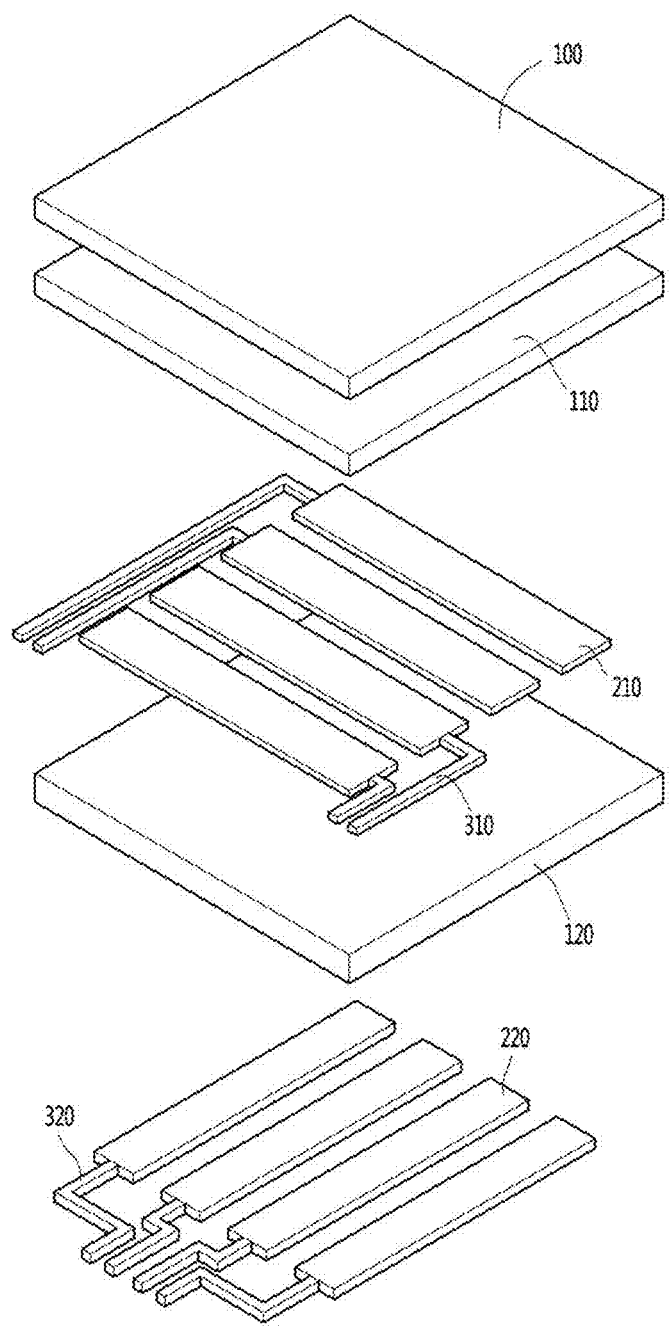
Figure 28:
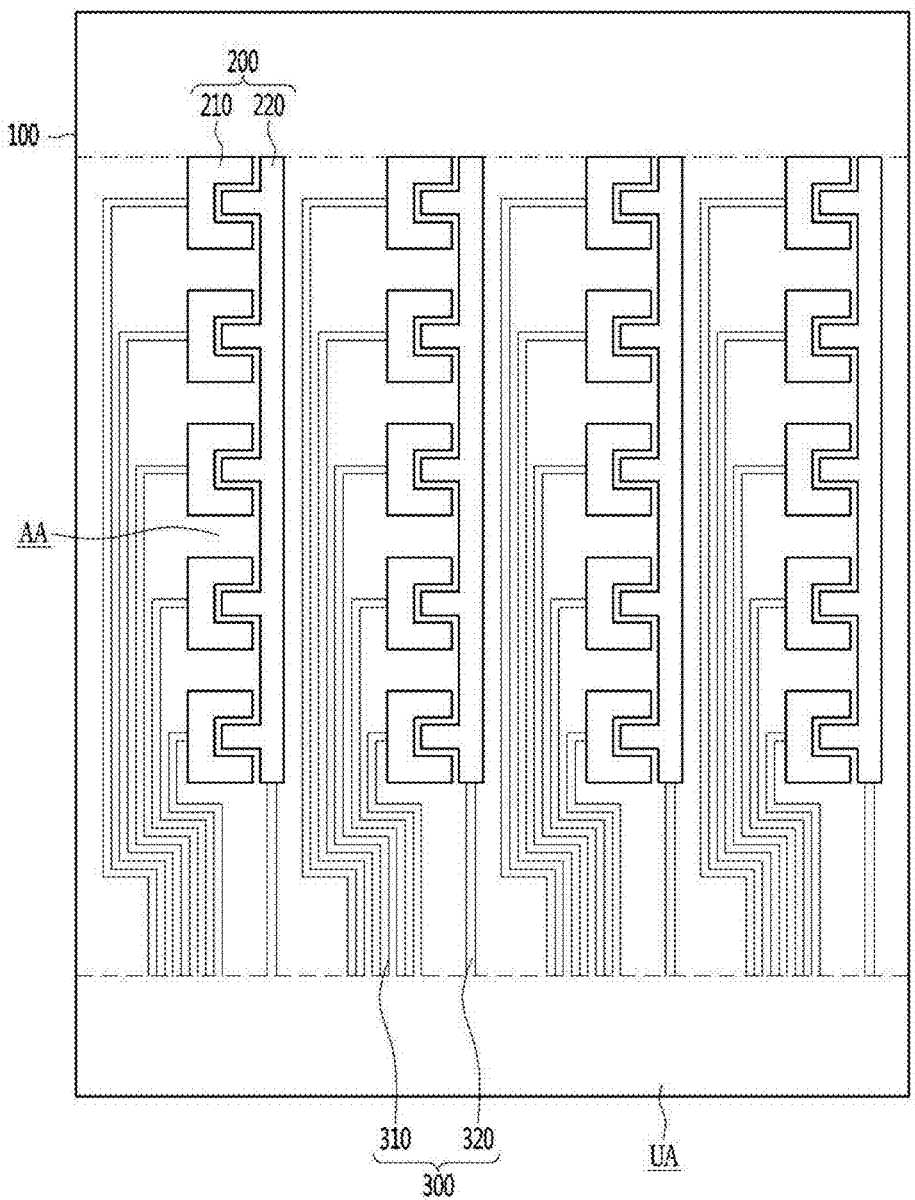

FIGS. 26 to 28 are views to explain various types of touch windows according to the embodiment.

Referring to FIG. 26, the various types of touch windows may include a cover substrate 100 and a substrate 110, and may include a first sensing electrode 210 on the cover substrate 100.

In detail, the cover substrate 100 may be provided on one surface thereof with a first sensing electrode extending in one direction and a first wiring electrode 310 connected with the first sensing electrode 210. The substrate 110 may be provided on one surface thereof with a second sensing electrode 220 extending in a direction different from the one direction and a second wiring electrode 320 connected with the second sensing electrode 220.

Alternatively, the sensing electrode may not be provided on the cover substrate 100, but may be provided only opposite surfaces of the substrate 110.

In detail, the substrate 110 may be provided on one surface thereof with the first sensing electrode 210 and the first wiring electrode 310 connected with the first sensing electrode 210. The substrate 110 may be provided on an opposite surface thereof with the second sensing electrode 220 extending in a direction different from the one direction and a second wiring electrode 320 connected with the second sensing electrode 220.

Referring to FIG. 27, another type of a touch window may include a cover substrate 100, first and second substrates 110 and 120, a first sensing electrode on the first substrate 110, and a second sensing electrode on the second substrate 120.

In detail, the first substrate 110 may be provided on one surface thereof with the first sensing electrode 210 extending in one direction and the first wiring electrode 310 connected with the first sensing electrode 210. The second substrate 120 may be provided on one surface thereof with a second sensing electrode 220 extending in a direction different from one direction and the second wiring electrode 320 connected with the second sensing electrode 220.

Referring to FIG. 28, still another type of a touch window may include the cover substrate 100, and the first sensing electrode 210 and the second sensing electrode 220 on the cover substrate.

The first sensing electrode 210 and the second sensing electrode 220 may be provided on the same plane of the cover substrate 100. For example, the first sensing electrode 210 and the second sensing electrode 220 may be spaced apart from each other on the same plane of the cover substrate 100.

In addition, the first wiring electrode 310 connected with the first sensing electrode 210 and the second wiring electrode 320 connected with the second sensing electrode may be included. The first wiring electrode 310 may be provided on an active area and an inactive area of the cover substrate 100, and the second wiring electrode 320 may be provided on the inactive area of the cover substrate 100.

The above-described touch window may be assembled with a display panel and the resultant structure may be applied to a touch device. For example, the touch window may be coupled to an adhesive layer of the display panel.

Figure 29:
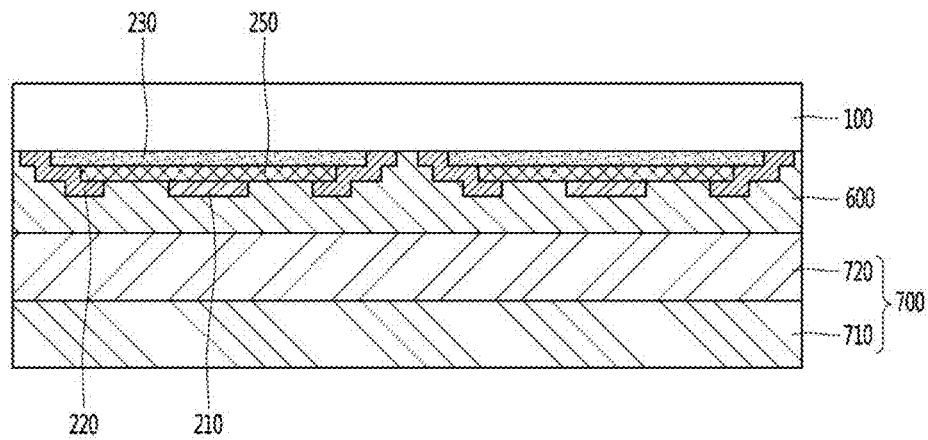
FIGS. 29 to 31 are views to explain a touch device manufactured by manufacturing a touch window according to the embodiment and a display panel.

Referring to FIG. 29, a touch device according to the embodiment may include a touch window provided on a display panel 700.

In detail, referring to FIG. 29, the touch device may be formed by assembling the cover substrate 100 with the display panel 700. The cover substrate 100 and the display panel 700 may be bonded to each other through an adhesive layer 600. For example, the cover substrate 100 and the display panel 700 may be combined with each other through the adhesive layer 600 including an optical clear adhesive (OCA, OCR).

The display panel 700 may include a first prim substrate 710 and a second prims substrate 720.

When the display panel 700 is a liquid crystal display panel, the display panel 700 may be formed in the structure in which the first prime substrate 710 including a thin film transistor (TFT) and a pixel electrode is combined with the second prim substrate 720 including a color filter layer while a liquid crystal layer is interposed between the first prime substrate 710 and the second prime substrate 720.

In addition, the display panel 700 may be a liquid crystal display panel having a COT (color filter on transistor) structure in which a thin film transistor, a color filter, and a black matrix are formed on the first prime substrate 710, and the first prime substrate 610 is combined with the second prime substrate 720 while a liquid crystal layer is interposed between the first and second panel substrates 710 and 720. In other words, the thin film transistor may be formed on the first prime substrate 710, a protective layer may be formed on the thin film transistor, and the color filter layer may be formed on the protective layer. In addition, a pixel electrode making contact with the thin film transistor is formed on the first prime substrate 710. In this case, in order to improve the aperture ratio and simplify the mask process, the black matrix may be omitted, and the common electrode may serve as the black matrix.

In addition, when the display panel 700 is a liquid crystal display panel, the display device may further include a backlight unit for providing light from the rear surface of the display panel 700.

When the display panel 700 is an organic electroluminescent display panel, the display panel 700 may include a self-light emitting device which does not require any additional light source. The display panel 700 includes a thin film transistor formed on the first prime substrate 710 and an organic light emitting device (OLED) making contact with the thin film transistor. The OLED may include an anode, a cathode and an organic light emitting layer formed between the anode and the cathode. In addition, the second prime substrate 720 may be further formed on the organic light emitting device to perform the function of an encapsulation substrate for encapsulation.

Figure 30:
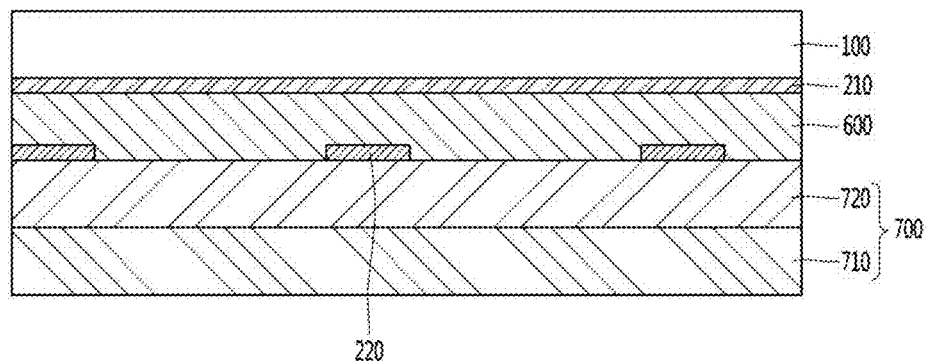

Referring to FIG. 30, the touch device according to the embodiment may include a touch panel integrally formed with the display panel 700. In other words, the substrate to support at least one sensing electrode may be omitted.

In detail, at least one sensing electrode may be provided on at least one surface of the display panel 700. That is, at least one sensing electrode may be provided on at least one surface of the first prime substrate 710 or the second prime substrate 720.

In this case, at least one sensing electrode may be provided on a top surface of an upper substrate.

Referring to FIG. 30, the first sensing electrode 210 may be provided on one surface of the cover substrate 100. In addition, a first wire connected with the first sensing electrode 210 may be provided. Further, the second sensing electrode 220 may be provided on one surface of the display panel 700. Further, a second wire connected with the second sensing electrode 220 may be provided.

The adhesive layer 600 may be provided between the cover substrate 100 and the display panel 700 and thus the cover substrate may be combined with the display panel 700.

In addition, a polarizing plate may be provided under the cover substrate 100. The polarizing plate may be a linear polarizing plate or an anti-reflection polarizing plate. For example, when the display panel 700 is a liquid crystal display panel, the polarizing plate may be a linear polarizing plate. In addition, when the display panel 700 is an organic electroluminescent display panel, the polarizing plate may be an anti-reflection polarizing plate.

The touch device according to the embodiment may omit at least one substrate that supports the sensing electrode. Thus, the touch device having thin thickness and light weight can be obtained.

Figure 31:
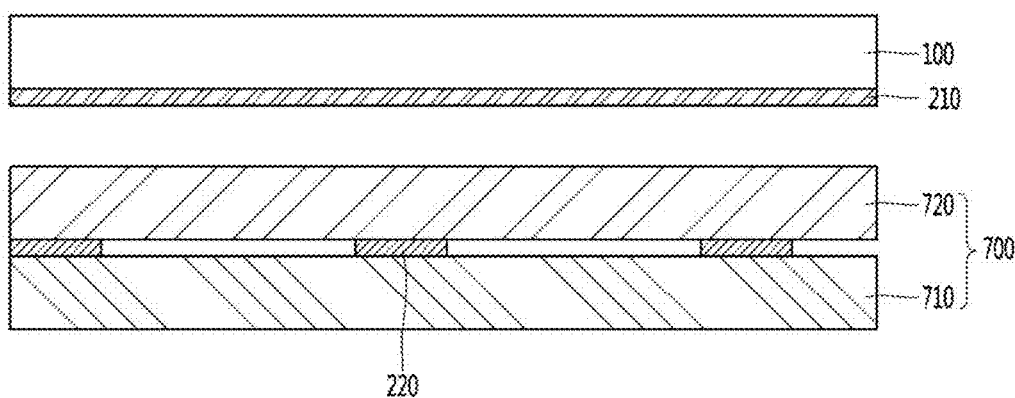
Figure 32:
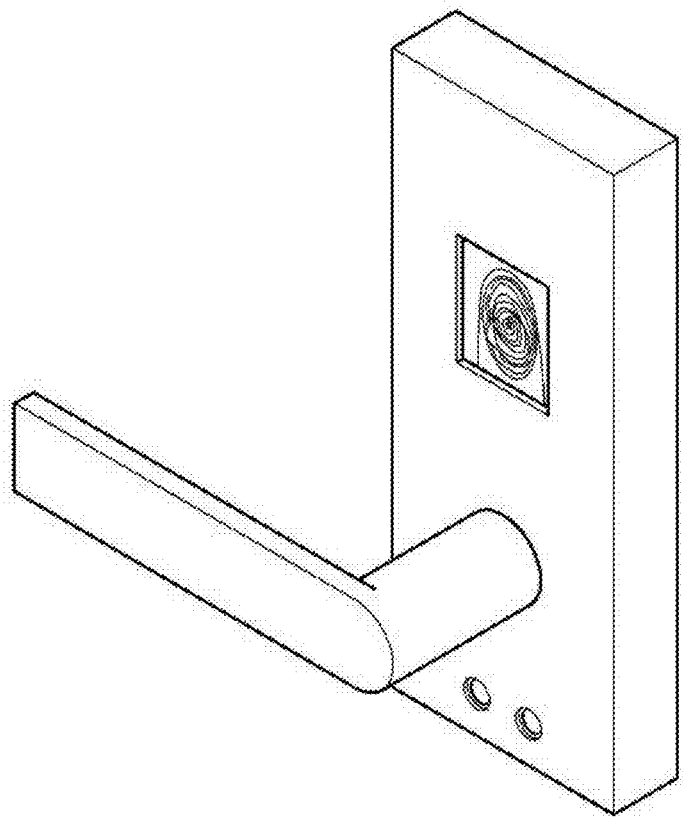
FIGS. 32 to 35 are views showing various devices to which a fingerprint sensor according to embodiments is applied.

Referring to FIG. 31, the touch device according to another embodiment may include a touch panel formed integrally with the display panel 700. That is, the substrate 100 that supports at least one sensing electrode may be omitted.

For example, the sensing electrode provided in the active area to serve as a sensor which senses a touch and a wire to apply an electrical signal to the sensing electrode may be formed inside the display panel. In detail, at least one sensing electrode or at least one wire may be formed inside the display panel.

The display panel may include the first prime substrate 710 and the second prime substrate 720. In this case, at least one of the first and second sensing electrodes 210 and 220 may be interposed between the first prime substrate 710 and the second prime substrate 720. In other words, at least one sensing electrode may be provided on at least one surface of the first prime substrate 710 or the second prime substrate 720.

Referring to FIG. 31, the first sensing electrode 210 may be provided on one surface of the cover substrate. Further, the first wire connected with the first sensing electrode 210 may be provided. In addition, the second sensing electrode 220 and the second wire may be provided between the first prime substrate 710 and the second prime substrate 720. That is, the second sensing electrode 220 and the second wire may be provided inside the display panel and the first sensing electrode 210 and the first wire may be provided outside the display panel.

The second sensing electrode 220 and the second wire may be provided on the top surface of the first prime substrate 710 or the rear surface of the second prime substrate 720.

In addition, a polarizing plate may be further provided under the cover substrate 100.

When the display panel is a liquid crystal display panel, and when the second sensing electrode 220 is formed on the top surface of the first prime substrate 710, the sensing electrode may be formed together with a thin film transistor (TFT) or a pixel electrode. In addition, when the second sensing electrode is formed on the rear surface of the second prime substrate 720, a color filter layer may be formed on the sensing electrode or the sensing electrode may be formed on the color filter layer. When the display panel is an organic electroluminescent display panel, and when the second sensing electrode is formed on the top surface of the first prime substrate 710, the second sensing electrode may be formed together with a thin film transistor or an organic light emitting device.

The touch device according to the embodiment may omit at least one substrate that supports the sensing electrode. Thus, the touch device having thin thickness and light weight can be obtained. In addition, the sensing electrode and the wire may be formed together with devices formed on the display panel, so that the process can be simplified and the cost can be saved.

Hereinafter, examples of various devices, to which the above-described fingerprint sensors according to the embodiments are applied, will be described with reference to FIGS. 32 to 35.

The fingerprint sensor according to the embodiments may be applied to a lock device. For example, the fingerprint sensor according to the embodiments may be applied to an electronic product such that the fingerprint sensor is applied to a locking device of an electronic product.

Figure 33:
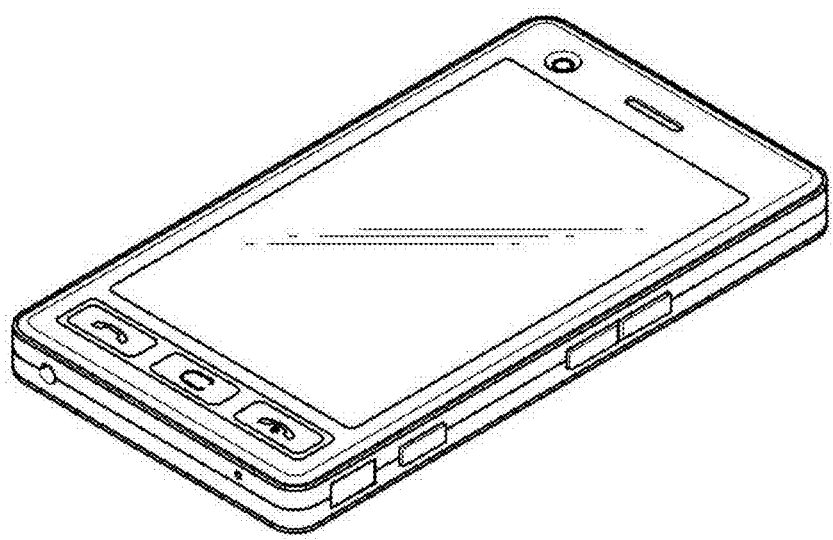

In detail, as shown in FIG. 3, the fingerprint sensor according to the embodiments is coupled to a door lock to serve as a locking device of the door lock. In addition, as shown in FIG. 33, the fingerprint sensor may be coupled to a cellular phone such that the fingerprint sensor is applied to a locking device of the cellular phone.

Alternatively, the fingerprint sensor according to the embodiments may be applied to a power supply device. For example, the fingerprint sensor according to the embodiments may be applied to an electronic appliance or a vehicle.

Figure 34:
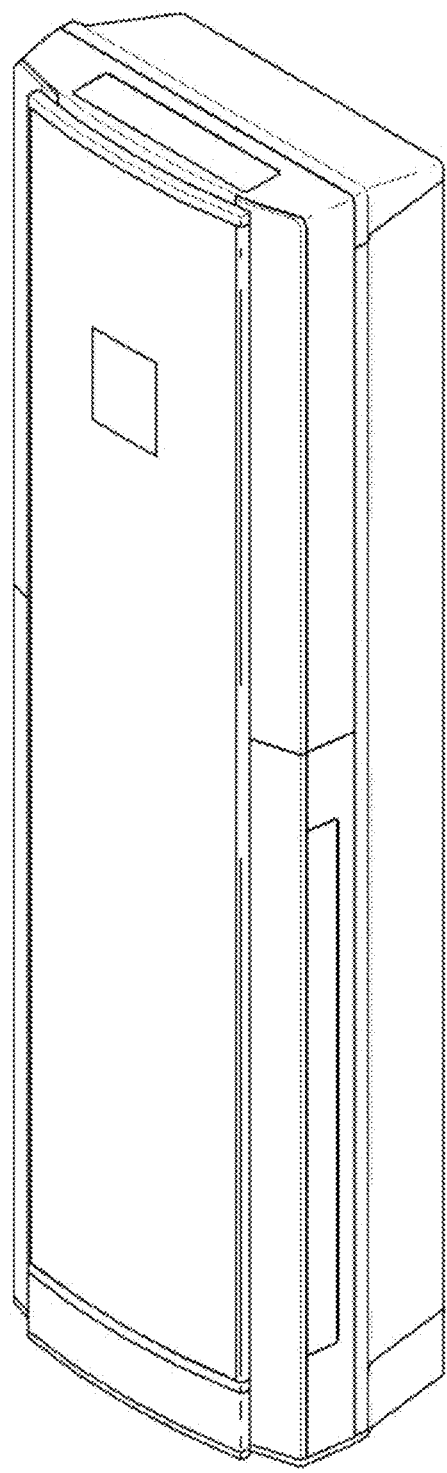
Figure 35:
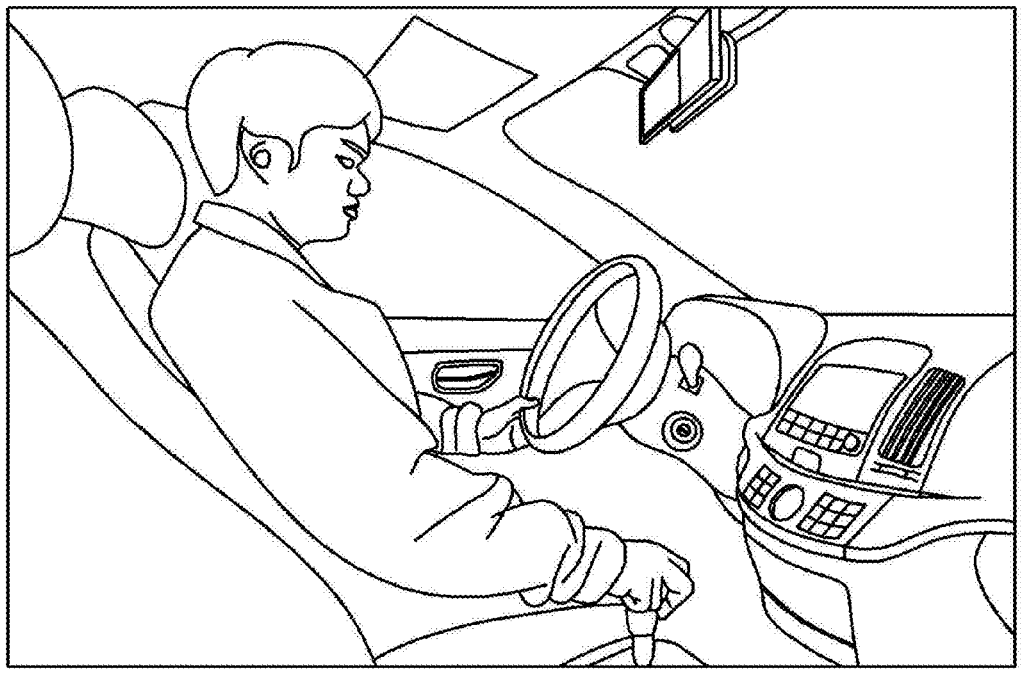

In detail, as shown in FIG. 34, the fingerprint sensor may be coupled to an electronic appliance, such as an air conditioner, such that the fingerprint sensor is applied to a power supply. In addition, as shown in FIG. 35, the fingerprint sensor may be applied to a vehicle such that the fingerprint sensor is applied to a power supply device for a starting device of the vehicle, car audio equipment, or the like.

However, the embodiment is not limited thereto. The fingerprint sensor may be used for various electronic products.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A touch device comprising:
a cover substrate including an active area and an inactive area;
a first sensing electrode and a second sensing electrode provided on the active area;
a first wiring electrode and a second wiring electrode provided on the inactive area;
a receiving grove formed in one surface of the cover substrate,
a protrusion part formed on the opposite surface of the cover substrate,
a decoration layer provided on the inactive area; and
a fingerprint sensor on the decoration layer,
wherein the active area and the inactive area of the cover substrate make a step difference therebetween,
wherein one end of the first wiring electrode and one end of the second wiring electrode are connected with the first sensing electrode and the second electrode, respectively, and
wherein an opposite end of the first wiring electrode and an opposite end of the second wiring electrode are connected with a printed circuit board.

2. The touch device of claim 1, wherein the thickness of the active area of the cover substrate is thicker than the thickness of the inactive area.

3. The touch device of claim 1, wherein the decoration layer includes:
a first decoration layer on the cover substrate; and
a second decoration layer on the first decoration layer, and
wherein the fingerprint sensor is interposed between the first decoration layer and the second decoration layer.

4. The touch device of claim 3, wherein the fingerprint sensor is provided on the second decoration layer.

5. The touch device of claim 4, further comprising a protective layer provided in the receiving groove and on the fingerprint sensor.

6. The touch device of claim 5, wherein the substrate includes one surface, in which the receive groove is formed, and an opposite surface in which the protrusion part is formed, and
wherein one surface of the protective layer and the one surface of the substrate are provided on the same plane.

7. A touch device comprising:
a display panel; and
a cover window on the display panel,
wherein the cover window includes:
a substrate including one surface and an opposite surface opposite;
a receiving groove formed in one surface; and
a protrusion part formed on the opposite surface,
wherein an area, in which the receiving groove is formed, overlaps with an area in which the protrusion part is formed,
wherein a fingerprint sensor is provided in the receiving groove,
wherein the substrate includes an active area and an inactive area, and
wherein the receiving groove and the protrusion part are formed in the inactive area,
wherein a substrate thickness in the area, in which the protrusion part is formed, is thinner than a substrate thickness in the area having no protrusion part.

8. The touch device of claim 7, wherein the inactive area includes a touch area, and
wherein the receiving groove and the protrusion part are formed in the touch area.

9. The touch device of claim 7, further comprising:
a decoration layer provided on a bottom surface of the receiving groove,
wherein the fingerprint sensor is provided on the decoration layer.

10. The touch device of claim 7, wherein a distance between a bottom surface of the receiving part to an outer surface of the protrusion part is in a range of 100 μm to 300 μm.

11. The touch device of claim 7, wherein at least one surface of the receiving groove includes a curved surface.

12. The touch device of claim 7, wherein the substrate thickness is in a range of 500 μm to 600 μm in the area in which the protrusion part is formed.

13. The touch device of claim 7, wherein the receiving groove has a height corresponding to at least 50% of the substrate thickness in the area in which the protrusion part is formed.

14. The touch device of claim 7, wherein the protrusion part has a height in a range of 5 μm to 60 μm.

15. The touch device of claim 7, wherein the protrusion part has a height reduced outward from the center of the protrusion part.

16. The touch device of claim 7, further comprising:
a first decoration layer provided in the inactive area of the substrate; and
a second decoration layer provided on a bottom surface of the receiving groove.

17. The touch device of claim 15, wherein the first decoration and the second decoration are formed in mutually different colors.

18. The touch device of claim 7, wherein the protrusion part includes a plurality of protrusion parts.

19. The touch device of claim 7, wherein a corner area of the receiving groove includes a curved surface.

* * * * *